United States Patent
Suematsu

(10) Patent No.: US 8,069,277 B2
(45) Date of Patent: Nov. 29, 2011

(54) SYSTEM AND METHOD FOR OPERATING USB PERIPHERAL DEVICE IN EXTENTED POWER MODE OR STANDARD POWER MODE WHEREIN PERMISSION FROM HOST MUST BE GRANTED BEFORE EXTENDED POWER IS PROVIDED

(75) Inventor: Toshinari Suematsu, Saitama (JP)

(73) Assignee: Sony NEC Optiarc Inc., Tokyo (JP)

( * ) Notice: Subject to any disclaimer, the term of this patent is extended or adjusted under 35 U.S.C. 154(b) by 214 days.

(21) Appl. No.: 12/347,024

(22) Filed: Dec. 31, 2008

(65) Prior Publication Data
US 2009/0193156 A1 Jul. 30, 2009

(30) Foreign Application Priority Data
Jan. 28, 2008 (JP) ................................. 2008-015955

(51) Int. Cl.
*G06F 1/26* (2006.01)
*G06F 3/00* (2006.01)
(52) U.S. Cl. ................ 710/14; 710/15; 710/16; 710/17; 710/18; 710/19; 710/72; 710/74; 713/300; 713/303; 713/310; 369/44.29
(58) Field of Classification Search .............. 710/14–19, 710/72, 74; 713/300, 310, 320, 322, 324, 713/303; 369/44.29
See application file for complete search history.

(56) References Cited

U.S. PATENT DOCUMENTS

| | | | | |
|---|---|---|---|---|
| 5,884,086 A * | 3/1999 | Amoni et al. ................. | 713/300 |
| 6,357,011 B2 * | 3/2002 | Gilbert .......................... | 713/300 |
| 6,477,388 B1 * | 11/2002 | Schmutz ....................... | 455/522 |
| 6,633,932 B1 * | 10/2003 | Bork et al. ..................... | 710/72 |
| 6,665,801 B1 * | 12/2003 | Weiss ............................. | 713/300 |
| 6,668,296 B1 * | 12/2003 | Dougherty et al. ........... | 710/303 |
| 6,789,207 B1 * | 9/2004 | Maejima ....................... | 713/322 |

(Continued)

FOREIGN PATENT DOCUMENTS
JP 3674855 5/2005
(Continued)

OTHER PUBLICATIONS

Lynn et al, Universal Sirial Bus (USB) Power Management, Apr. 1997, IEEE, pp. 434-441.*

*Primary Examiner* — Tammara Peyton
(74) *Attorney, Agent, or Firm* — Oblon, Spivak, McClelland, Maier & Neustadt, L.L.P.

(57) ABSTRACT

A peripheral device is connected to a host device by a transmission path according to a predetermined interface standard to be communicable with the host device, and operates with power supply received from the host device through the transmission path. The peripheral device includes a main operation unit and a control unit. The main operation unit uses, in the operation thereof, non-standard current higher than an upper limit current value specified by the interface standard. The control unit operates in a standard power mode, which consumes current not exceeding the upper limit current value specified by the interface standard, to send the host device information indicating the use of the non-standard current, and performs, upon receipt from the host device of permission to use an extended power mode, which consumes the non-standard current, a process of activating the operation of the main operation unit in the extended power mode.

13 Claims, 14 Drawing Sheets

U.S. PATENT DOCUMENTS

| | | | |
|---|---|---|---|
| 6,810,481 B1 * | 10/2004 | Kawade et al. | 713/300 |
| 7,017,055 B1 * | 3/2006 | Ho | 713/300 |
| 7,043,646 B2 * | 5/2006 | Enami et al. | 713/300 |
| 7,203,044 B2 * | 4/2007 | Ando et al. | 361/79 |
| 7,293,187 B2 * | 11/2007 | Ono | 713/324 |
| 7,329,969 B2 * | 2/2008 | Niinuma | 307/130 |
| 7,454,630 B1 * | 11/2008 | Ong et al. | 713/300 |
| 7,467,306 B2 * | 12/2008 | Cartes et al. | 713/300 |
| 7,489,974 B2 * | 2/2009 | Numano | 700/22 |
| 7,506,186 B2 * | 3/2009 | Takeuchi et al. | 713/310 |
| 7,523,325 B2 * | 4/2009 | Jang | 713/310 |
| 7,539,886 B2 * | 5/2009 | Suga et al. | 713/324 |
| 7,631,200 B2 * | 12/2009 | Niwa et al. | 713/300 |
| 7,647,516 B2 * | 1/2010 | Ranganathan et al. | 713/320 |
| 7,766,698 B1 * | 8/2010 | De Iuliis et al. | 439/638 |
| 7,843,171 B2 * | 11/2010 | Schroeder et al. | 320/138 |
| 7,847,517 B2 * | 12/2010 | Guthrie et al. | 320/107 |
| 7,871,278 B1 * | 1/2011 | Herring et al. | 439/136 |
| 2003/0110403 A1 * | 6/2003 | Crutchfield et al. | 713/300 |
| 2005/0088931 A1 * | 4/2005 | Takeuchi et al. | 369/44.29 |
| 2005/0174710 A1 | 8/2005 | Masui et al. | |
| 2005/0267999 A1 | 12/2005 | Suematsu et al. | |
| 2008/0201583 A1 * | 8/2008 | Fujiwara et al. | 713/300 |
| 2009/0184687 A1 * | 7/2009 | Schroeder et al. | 320/162 |

FOREIGN PATENT DOCUMENTS

| | | |
|---|---|---|
| JP | 2005-339067 | 12/2005 |

* cited by examiner

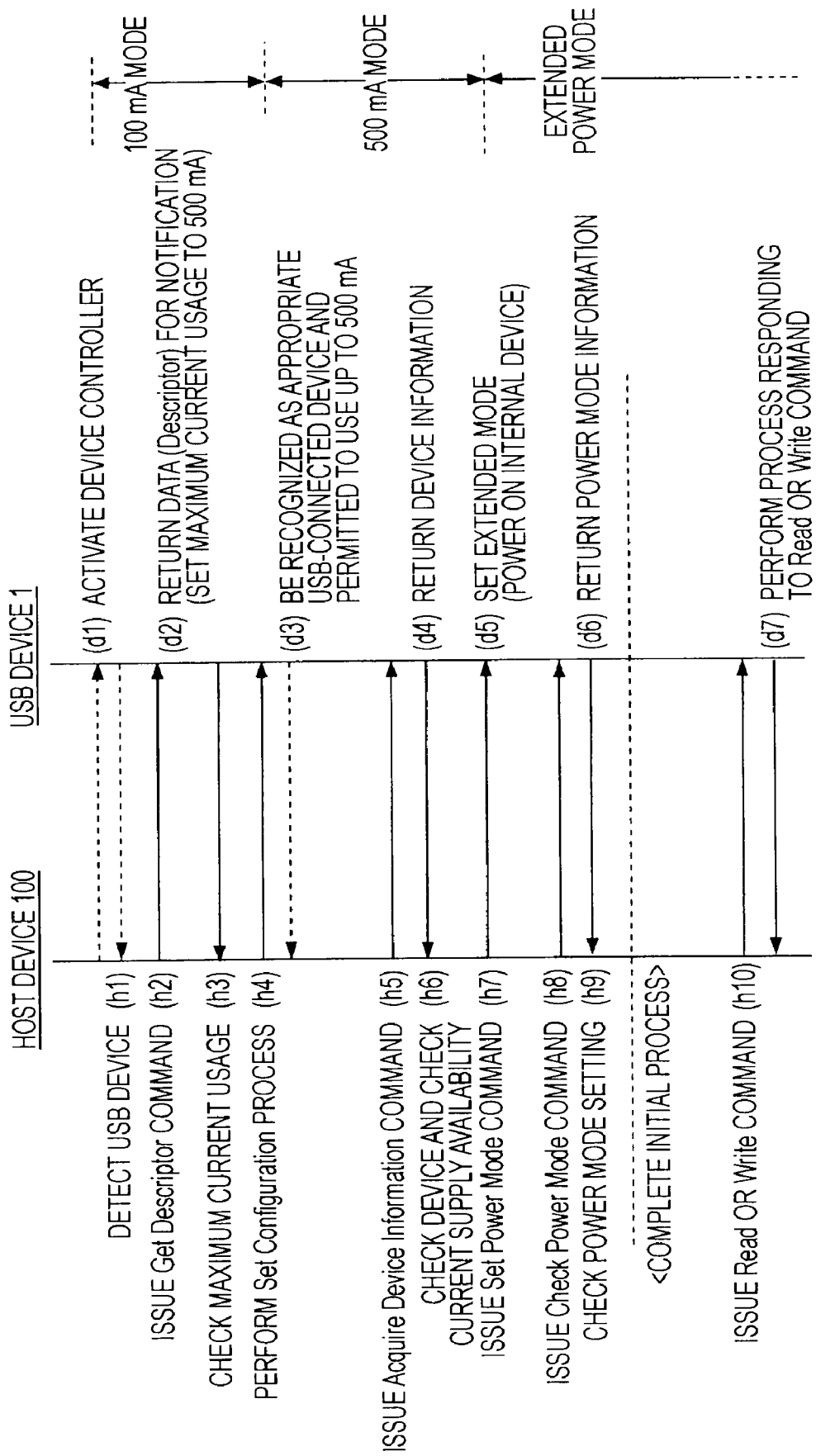

FIG. 8A

| BIT<br>BYTE NO. | 7 | 6 | 5 | 4 | 3 | 2 | 1 | 0 |
|---|---|---|---|---|---|---|---|---|
| 0 | RESERVED (000b) | | | PERIPHERAL DEVICE TYPE (05h) | | | | |
| 1 | RMB (1b) | RESERVED (00h) | | | | | | |
| 2 | ISO Ver (00b) | | ECMA Ver (000b) | | | ANSI Ver (000b) | | |
| 3 | ATAPI TRANSPORT Ver (3h) | | | | RESPONSE DATA FORMAT (2h) | | | |
| 4 | ADDITIONAL LENGTH (33h) | | | | | | | |
| 5 | SCCS etc. (00h) | | | | | | | |
| 6-7 | RESERVED (00h) | | | | | | | |
| 8-15 | VENDOR IDENTIFICATION | | | | | | | |
| 16-31 | PRODUCT IDENTIFICATION | | | | | | | |
| 32-35 | PRODUCT REVISION LEVEL | | | | | | | |
| 36-55 | VENDOR SPECIFIC | | | | | | | |

FIG. 8B

| BIT<br>BYTE NO. | 7 | 6 | 5 | 4 | 3 | 2 | 1 | 0 |
|---|---|---|---|---|---|---|---|---|
| 0 | DATA CONTENTS RETURNED BY MAIN OPERATION UNIT | | | | | | | |
| 1 | | | | | | | | |
| 2 | | | | | | | | |
| 3 | | | | | | | | |
| 4 | | | | | | | | |
| 5 | | | | | | | | |
| 6-7 | | | | | | | | |
| 8-15 | | | | | | | | |
| 16-31 | | | | | | | | |
| 32-35 | | | | | | | | |
| 36-55 | VENDOR SPECIFIC | | | | | | | |

FIG. 9A

| BIT BYTE NO. | 7 | 6 | 5 | 4 | 3 | 2 | 1 | 0 |
|---|---|---|---|---|---|---|---|---|
| 0 | OP CODE (E0h) ||||||||
| 1 | LUN (000b) ||| DATA TYPE |||||
| 2 | POWER MODE ||||||||
| 3 | RESERVED (00h) ||||||||
| 4 | RESERVED (00h) ||||||||
| 5 | RESERVED (00h) ||||||||
| 6 | RESERVED (00h) ||||||||
| 7 | RESERVED (00h) ||||||||
| 8 | RESERVED (00h) ||||||||
| 9 | RESERVED (00h) ||||||||
| 10 | RESERVED (00h) ||||||||
| 11 | RESERVED (00h) ||||||||

FIG. 9B

| BIT BYTE NO. | 7 | 6 | 5 | 4 | 3 | 2 | 1 | 0 |
|---|---|---|---|---|---|---|---|---|
| 0 | OP CODE (E1h) ||||||||
| 1 | LUN (000b) ||| DATA TYPE |||||
| 2 | RESERVED (00h) ||||||||
| 3 | RESERVED (00h) ||||||||
| 4 | RESERVED (00h) ||||||||
| 5 | RESERVED (00h) ||||||||
| 6 | RESERVED (00h) ||||||||
| 7 | RESERVED (00h) ||||||||
| 8 | ALLOCATION LENGTH (02h) ||||||||
| 9 | ALLOCATION LENGTH (02h) ||||||||
| 10 | RESERVED (00h) ||||||||
| 11 | RESERVED (00h) ||||||||

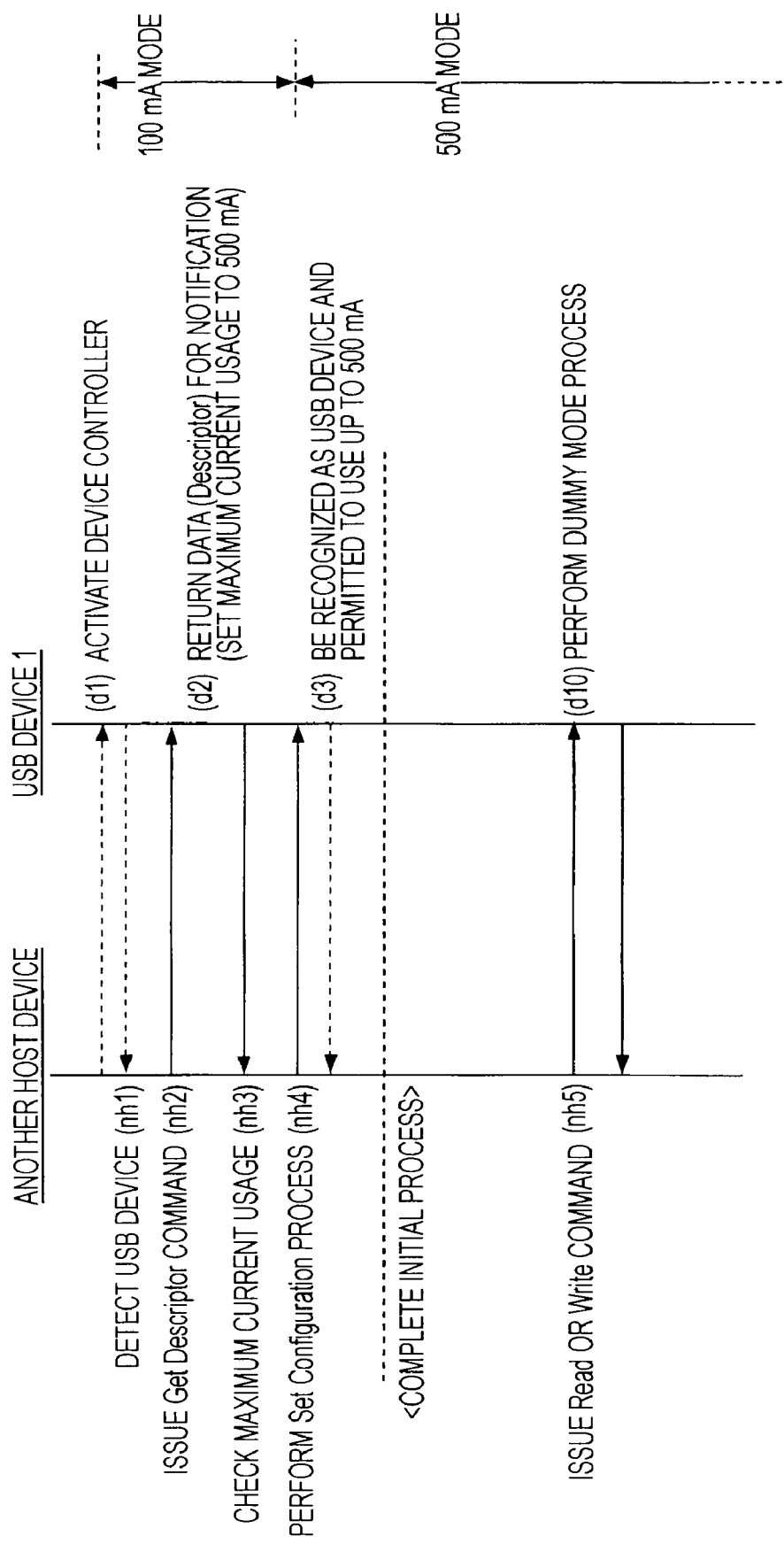

SYSTEM AND METHOD FOR OPERATING USB PERIPHERAL DEVICE IN EXTENTED POWER MODE OR STANDARD POWER MODE WHEREIN PERMISSION FROM HOST MUST BE GRANTED BEFORE EXTENDED POWER IS PROVIDED

CROSS REFERENCES TO RELATED APPLICATIONS

The present invention contains subject matter related to Japanese Patent Application JP 2008-015955 filed in the Japanese Patent Office on Jan. 28, 2008, the entire contents of which are incorporated herein by reference.

BACKGROUND OF THE INVENTION

1. Field of the Invention

The present invention relates to a peripheral device, a method of operating a peripheral device, a host device, and a method of operating a host device, e.g., a peripheral device and a host device connected to each other in accordance with a predetermined interface standard such as USB (Universal Serial Bus).

2. Description of the Related Art

There has been generally widespread an electronic device capable of performing various types of data communication with an external device in the connection according to an interface standard such as a USB standard, for example. For example, when a host device is assumed to be a personal computer, a peripheral device USB-connected to the personal computer (a USB device) includes a variety of electronic devices, such as a printer, an optical disc drive device, a magnetic disc drive device, an HDD (Hard Disc Drive), a camera, and a solid memory device (e.g., a flash memory device referred to as a so-called USB memory). Further, in the USB connection, power is supplied from the host device to the USB device through a USB cable.

Examples of the related art include Japanese Patent No. 3674855 and Japanese Unexamined Patent Application Publication No. 2005-339067.

SUMMARY OF THE INVENTION

The power supply in the USB connection is generally referred to as USB bus power. The USB standard specifies the USB bus power to be 5 V and 500 mA at a maximum. In terms of the standard, therefore, the host device is requested to be able to supply up to 500 mA of power to the USB device connected thereto.

Meanwhile, with the bus power within the limit of the standard, many of USB devices suffer from power shortage. For example, an optical disc drive or the like consumes approximately 1 A of current in many cases. Usually, therefore, it is common to connect an AC (Alternating Current) adaptor to the USB device to obtain operating power from a commercial alternating-current power supply. That is, in this method, the USB bus power is used as the power supply or only as an auxiliary power supply.

In this case, however, the use of the USB device involves the connection of the AC adaptor in addition to the USB cable. Thus, there is an issue of complicated connection and deteriorated usability. In the USB device, therefore, it is desired to obtain the operating power solely from the USB bus power and make the connection of the AC adaptor as unnecessary as possible.

As described above, however, the upper limit of the USB bus power is set to be 500 mA in the standard. Therefore, a USB device using current exceeding 500 mA suffers from a shortage of the operating power. In the 500 mA standard, the host device can be configured to be able to handle the supply of 500 mA of current at a maximum. Therefore, there also is a device having a current supply capability of only 100 mA, for example. Herein, if the host device has a high current supply capability, the host device can supply current of 500 mA or more. For example, the host device can supply sufficient USB bus power to a USB device consuming 1 A of current, for example.

However, the above-described case is possible only when the host device has the high current supply capability. A USB device is connectable to a variety of host devices having a USB terminal. Thus, the type of the device to be connected to the USB device is uncertain. For example, a personal computer or the like normally supports the supply of only up to 500 mA of current. If the USB device is connected to such a personal computer and draws approximately 1 A of current, for example, from the bus power, a trouble may be caused in the personal computer.

For example, if the USB device is connected to a host device supporting the supply of only up to 500 mA of current, and if an attempt is made to obtain current exceeding 500 mA from the USB bus power, the following are expected as examples of resultant troubles.

As the current exceeding the maximum current supply capability of the host device is drawn from the USB bus power, the internal voltage of the host device is reduced, and an erroneous operation is caused. Further, it is conceivable that, due to the above-described cause, the power supply capability of the USB bus decreases, and another USB device connected to the same USB host (or USB hub), to which the present USB device is connected, may not correctly operate. Further, if the host device is driven by a battery, and if the non-standard current continues to be drawn from the battery, it is conceivable that the remaining capacity of the battery may be rapidly reduced.

In view of the above-described circumstances, it is desirable in the present invention that even a peripheral device consuming current exceeding the limit of a standard can operate with power supply from a transmission path according to a predetermined interface standard, such as a USB bus power, and thus can solve the issue of connection of an AC adaptor or the like in addition to the transmission path according to the interface standard. Further, it is desirable in the present invention that, if the peripheral device is connected to a host device not supporting the supply of such non-standard power, the peripheral device is prevented from causing a trouble in the host device.

Therefore, the present invention proposes both a peripheral device and a host device. Further, the present invention proposes respective methods of operating the devices, and an electronic device system including the peripheral device and the host device.

Firstly, a peripheral device according to an embodiment of the present invention connected to a host device is as follows. The peripheral device according to the embodiment of the present invention is connected to a host device by a transmission path according to a predetermined interface standard to be communicable with the host device, and is configured to operate with power supply received from the host device through the transmission path. Further, the peripheral device includes a main operation unit configured to use, in the operation thereof, non-standard current higher than an upper limit current value specified by the interface standard, and a control unit configured to operate in a standard power mode, which consumes current not exceeding the upper limit current value specified by the interface standard, to send the host device information indicating the use of the non-standard current, and configured to perform, upon receipt from the host device of permission to use an extended power mode, which consumes the non-standard current, a process of activating the operation of the main operation unit in the extended power mode.

Further, if the control unit receives from the host device a command relating to the operation of the main operation unit after the activation of the operation of the main operation unit in the extended power mode, the control unit may cause the main operation unit to perform an operation according to the command.

Further, if the control unit does not receive the permission to use the extended power mode, which permits the use of the non-standard current, from the host device connected by the transmission path according to the predetermined interface standard (e.g., another host device other than a host device according to an embodiment of the present invention), the control unit may maintain the standard power mode and may not activate the operation of the main operation unit.

Further, in the standard power mode, if the control unit receives the command relating to the operation of the main operation unit from the host device connected by the transmission path according to the predetermined interface standard, the control unit may send predetermined dummy information in response to the command.

Further, the control unit may perform, as the activating process, a process of starting the power supply to the main operation unit from the transmission path.

Further, in accordance with a device information request from the host device connected by the transmission path according to the predetermined interface standard, the control unit may send the information indicating the use of the non-standard current as information recognizable solely by a host device capable of handling the non-standard current.

Further, the predetermined interface standard may be USB.

Further, upon receipt from the host device of an instruction to suspend the operation, the control unit may store in a memory unit the information of the power mode at the time of receipt of the instruction, and then may perform a process of shifting to a suspended state.

In this case, upon receipt from the host device of an instruction to resume the operation, the control unit may read the information of the power mode stored in the memory unit, and may perform a process of resuming to the state of the read power mode.

A method of operating a peripheral device according to an embodiment of the present invention operates a peripheral device including a main operation unit configured to use, in the operation thereof, non-standard current higher than an upper limit current value specified by the interface standard, and a control unit configured to control the communication with a host device and the operation of the main operation unit. Further, the method includes the steps of causing the control unit to operate in a standard power mode, which consumes current not exceeding the upper limit current value specified by the interface standard, to send the host device information indicating the use of the non-standard current, and causing the control unit to activate, upon receipt from the host device of permission to use an extended power mode, which permits the use of the non-standard current, the operation of the main operation unit by setting the power mode to the extended power mode.

A host device according to an embodiment of the present invention is connected to a peripheral device by a transmission path according to a predetermined interface standard to be communicable with the peripheral device, and is configured to supply power to the peripheral device through the transmission path. Further, in the power supply to the peripheral device, the host device is configured to be able to supply non-standard current higher than an upper limit current value specified by the interface standard. Further, the host device includes a control unit configured to send the peripheral device permission to use an extended power mode, which consumes the non-standard current, upon receipt from the peripheral device of information indicating the use of the non-standard current.

Further, a method of operating a host device according to an embodiment of the present invention includes the steps of receiving from the peripheral device information indicating the use of the non-standard current, and sending the peripheral device permission to use an extended power mode, which consumes the non-standard current, upon receipt of the information.

An electronic device system according to an embodiment of the present invention is formed by the peripheral device and the host device described above.

In the embodiments of the present invention described above, the peripheral device is a device using non-standard current in a predetermined interface standard such as USB. The peripheral device receives power supply from a transmission path according to the interface standard. Therefore, another power supply acquisition device such as an AC adaptor is unnecessary.

The host device according to the embodiment of the present invention has a sufficient current supply capability. That is, the host device is designed to supply non-standard current without problems. Therefore, if the host device is connected to the peripheral device according to the embodiment of the present invention, and if the host device supplies the non-standard current to the peripheral device according to the embodiment of the present invention, a trouble is not caused.

Meanwhile, if the peripheral device according to the embodiment of the present invention is connected to a host device other than the host device according to the embodiment of the present invention (hereinafter referred to as "another host device"), and if the peripheral device draws non-standard current from the another host device, a trouble may be caused in the another host device.

In view of this possibility, the peripheral device according to the embodiment of the present invention activates the operation of the main operation unit, which uses the non-standard current, only when the host device according to the embodiment of the present invention permits the extended power mode. Therefore, the host device according to the embodiment of the present invention can be said to be a device assuming the extended power mode of the peripheral device according to the embodiment of the present invention, which consumes the non-standard current.

If the peripheral device according to the embodiment of the present invention is connected to the another host device described above, which does not assume the extended power mode of the peripheral device according to the embodiment of the present invention, the another host device does not perform the operation of permitting the peripheral device according to the embodiment of the present invention to use the extended power mode. In the first place, the operations performed by the another host device do not include the operation of permitting the extended power mode. Therefore, the peripheral device according to the embodiment of the present invention does not activate the operation of the main operation unit in the extended power mode. Accordingly, the peripheral device according to the embodiment of the present invention does not draw the non-standard current from the another host device, and thus does not cause a trouble in the another host device.

The peripheral device according to the embodiment of the present invention obtains the non-standard current from the host device according to the embodiment of the present invention through the transmission path according the predetermined interface standard. Therefore, the peripheral device according to the embodiment of the present invention can make it unnecessary to obtain the operating power by the connection of an AC adaptor or the like. Accordingly, the peripheral device according to the embodiment of the present invention can improve the usability thereof.

Further, if the peripheral device according to the embodiment of the present invention is connected to another host device other than the host device according to the embodiment of the present invention, the peripheral device does not draw the non-standard current from the transmission path according to the interface standard. Accordingly, the peripheral device according to the embodiment of the present invention does not cause a trouble in the another host device.

BRIEF DESCRIPTION OF THE DRAWINGS

FIG. 7 is an explanatory diagram of an initial process performed at the time of connection in the embodiment;

FIGS. 8A and 8B are explanatory diagrams of device information used in the embodiment;

FIGS. 9a and 9B are explanatory diagrams of commands relating to the power mode used in the embodiment;

FIG. 10 is an explanatory diagram of an initial process performed when the USB device of the embodiment is connected to another host device;

DESCRIPTION OF THE PREFERRED EMBODIMENTS

An embodiment of the present invention will be described below in the order of 1) System configuration, 2) Configuration of host device, 3) Configuration of USB device, 4) Operation performed when USB device is connected to host device, 5) Operation performed when USB device is connected to another host device, 6) Suspend process and resume process, and 7) Effects of embodiment and modification examples.

1. System Configuration

Figure 1:
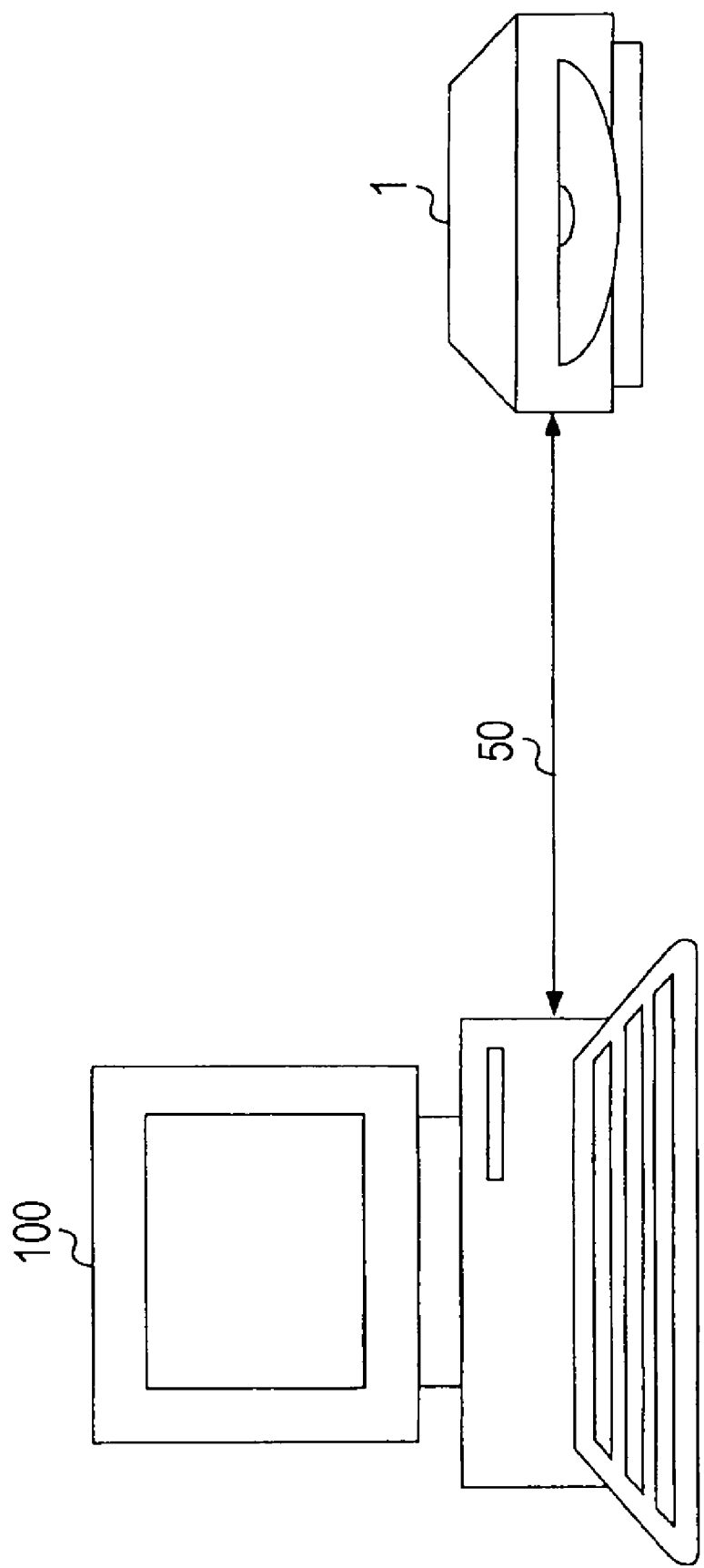
FIG. 1 is an explanatory diagram of a system configuration in an embodiment of the present invention.

FIG. 1 illustrates an electronic device system according to the embodiment. In this case, a USB device 1 and a host device 100 are an example of a peripheral device according to an embodiment of the present invention and an example of a host device according to an embodiment of the present invention, respectively. FIG. 1 illustrates a state in which the devices are connected to each other by a USB cable 50.

The USB device 1 is an electronic device USB-connected as a peripheral device of the host device 100. That is, the USB device 1 is an electronic device which is connected to the host device 100 by the USB cable 50 in accordance with a USB interface standard to be communicable with the host device 100, and which operates with power supply received as USB bus power from the host device 100 through the USB cable 50.

In the embodiment, the USB device 1 will be specifically described as an optical disc drive. For example, the USB device 1 is assumed to be a device which performs a recording or reproducing operation on a portable recording medium, such as a CD (Compact Disc), a DVD (Digital Versatile Disc), and a Blu-ray Disc (registered trademark).

The host device 100 is an electronic device which is communicable with the USB device 1 functioning as the peripheral device, and which supplies power as the USB bus power to the USB device 1. In the description of the embodiment, the host device 100 is assumed to be a personal computer.

In the present example, the optical disc drive functioning as the USB device 1 consumes current exceeding 500 mA, which is the upper limit of the USB standard, to perform the recording or reproducing operation on an optical disc loaded in the optical disc drive. That is, the optical disc drive requests the supply of current of a 500 mA or more, e.g., 1 A, as the USB bus power.

Further, in terms of the power supply to the USB device 1, the host device 100 is designed to be able to supply non-standard current (e.g., 1 A) exceeding the upper limit current value specified by the USB standard. That is, the host device 100 is designed not to have a particular trouble even if approximately 1 A of current is drawn therefrom by the USB device 1 through the USB cable 50.

Therefore, in the system of FIG. 1, even if the USB device 1 uses approximately 1 A of current to be consumed for the recording or reproducing operation performed on the optical disc, a normal operation can be performed with the power supply solely by the USB bus power.

Meanwhile, if the USB device 1 is connected to another host device and performs an operation accompanying the consumption of approximately 1 A of current, a trouble may be caused in the another host device. In view of this, the USB device 1 of the present example activates the recording or reproducing operation, which uses the current exceeding the limit of the USB standard, e.g., 1 A of current, only when the host device 100 of the present example permits an extended power mode.

If the USB device 1 of the present example is connected to another host device other than the host device 100 of the present example (a host device not according to the embodiment of the present invention), the another host device, which does not assume the extended power mode of the USB device 1, does not perform the operation of permitting the USB device 1 to use the extended power mode.

In this case, the USB device 1 performs an operation in a standard power mode. The standard power mode is a power mode within the limit of the standard of the USB bus power, such as a 500 mA mode and a 100 mA mode, for example. In fact, in the standard power mode, the USB device 1 does not perform the recording or reproducing operation on the optical disc. Therefore, the USB device 1 does not draw the non-standard current from the another host device, and thus does not cause a trouble in the another host device.

2. Configuration of Host Device

Figure 2:
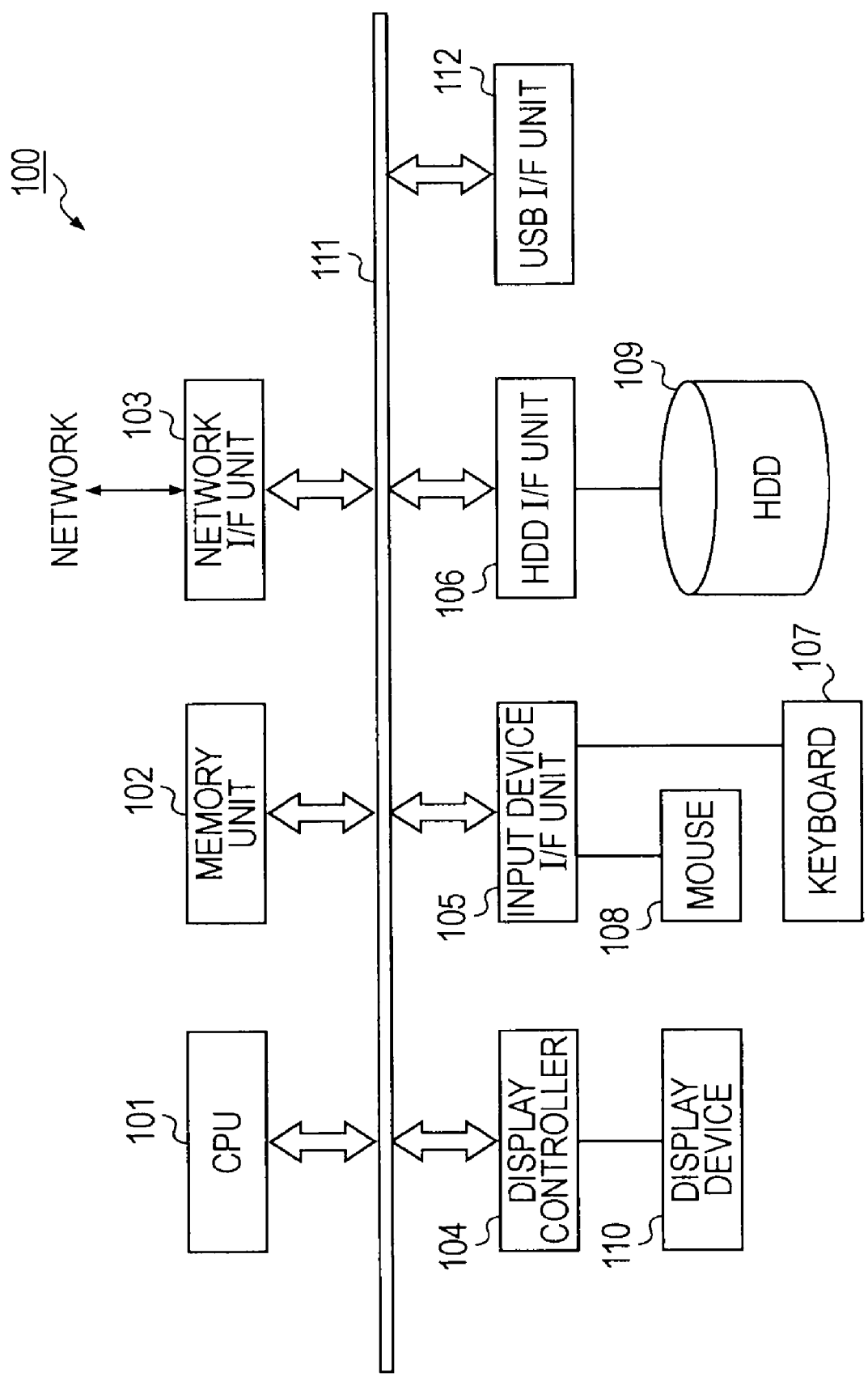
FIG. 2 is a block diagram of a host device in the embodiment.

FIG. 2 illustrates a configuration example of the host device 100. The host device 100 is assumed to be a personal computer of a common configuration, for example. As illustrated in the drawing, the host device 100 includes a CPU (Central Processing Unit) 101, a memory unit 102, a network interface unit 103, a display controller 104, an input device interface unit 105, an HDD interface unit 106, a keyboard 107, a mouse 108, an HDD (Hard Disc Drive) 109, a display device 110, a bus 111, a USB interface unit 112, and so forth.

The CPU 101 functioning as a main controller of the host device 100 performs a variety of control processes in accordance with programs stored in the memory unit 102. The CPU 101 and each of the other units are mutually connected by the bus 111. Each of the devices on the bus 111 is provided with a unique memory address or I/O (Input/Output) address. On the basis of the address, the CPU 101 can access the device. An example of the bus 111 is a PCI (Peripheral Component Interconnect) bus.

The memory unit 102 illustrated includes both a volatile memory and a non-volatile memory. For example, the memory unit 102 includes a ROM (Read-Only Memory) for storing programs, a RAM (Random Access Memory) for providing an arithmetic work area and temporarily storing a variety of data, and a non-volatile memory such as an EEP-ROM (Electrically Erasable and Programmable Read-Only Memory). The memory unit 102 stores program codes executed by the CPU 101, identification information unique to the host device 100, and other information, and is used as a buffer area for communication data or a work area for working data in process.

The network interface unit 103 connects the host device 100 to a network, such as the Internet and a LAN (Local Area Network), in accordance with a predetermined communication protocol such as Ethernet (registered trademark). The CPU 101 can communicate with each of network-connected devices via the network interface unit 103.

The display controller 104 is a special controller for actually processing a Draw command issued by the CPU 101. For example, the display controller 104 supports a bitmap drawing function corresponding to SVGA (Super Video Graphic Array) or XGA (extended Graphic Array), for example. Drawing data processed by the display controller 104 is temporarily written in a frame buffer (not illustrated), for example, and thereafter is output to a screen of the display device 110. The display device 110 is formed as, for example, an organic EL (Electroluminescence) display, a CRT (Cathode Ray Tube) display, an LCD (Liquid Crystal Display), or the like.

The input device interface unit 105 is a device for connecting user input devices, such as the keyboard 107 and the mouse 108, to a computer system functioning as the host device 100. That is, a user operation input into the host device 100 is performed with the use of the keyboard 107 and the mouse 108, and resultant operation input information is supplied to the CPU 101 via the input device interface unit 105.

The HDD interface unit 106 performs an interface process on the HDD 109 to perform a writing or reading operation.

As widely known, the HDD 109 is an external storage device in which a magnetic disc functioning as a memory carrier is fixedly installed, and which is superior to other external storage devices in terms of the storage capacity, the data transfer speed, and so forth. To place a software program on the HDD 109 in an executable state is referred to as "install." The HDD 109 normally stores, in a non-volatile manner, the program codes of an OS (Operating System) to be executed by the CPU 101, application programs, device drivers, and so forth. A variety of programs stored in the HDD 109 are developed in the memory unit 102 at the time of, for example, activation of the host device 100 and activation of an application program according to a user layer. The CPU 101 performs a process based on the program developed in the memory unit 102.

The USB interface unit 112 is an interface communicating with an external device connected in accordance with the USB standard. The CPU 101 communicates with the USB device 1 of the present example via the USB interface unit 112.

In the thus configured host device 100, the CPU 101 performs an arithmetic process and a control operation based on the software structure, i.e., software including the application programs, the OS, and the device drivers, to thereby perform a variety of operations.

In the present example, particularly as an operation of communicating with the USB device 1 connected via the USB interface unit 112, the operation described later is performed as the operation of the CPU 101 based on the above-described software structure.

As a characteristic operation of the CPU 101, the CPU 101 performs an operation of sending the USB device 1 permission to use the extended power mode (an instruction for using the extended power mode), which consumes the non-standard current, upon receipt from the USB device 1 of information indicating the use of the non-standard current.

The present host device 100 has a sufficient current supply capability capable of handling the consumption of the non-standard current. That is, the host device 100 is designed to supply the non-standard current without problems. Therefore, even if the host device 100 permits the USB device 1 to use the extended power mode, which consumes the non-standard current, and actually supplies the non-standard current to the USB device 1, a trouble is not caused.

3. Configuration of USB Device

Figure 3:
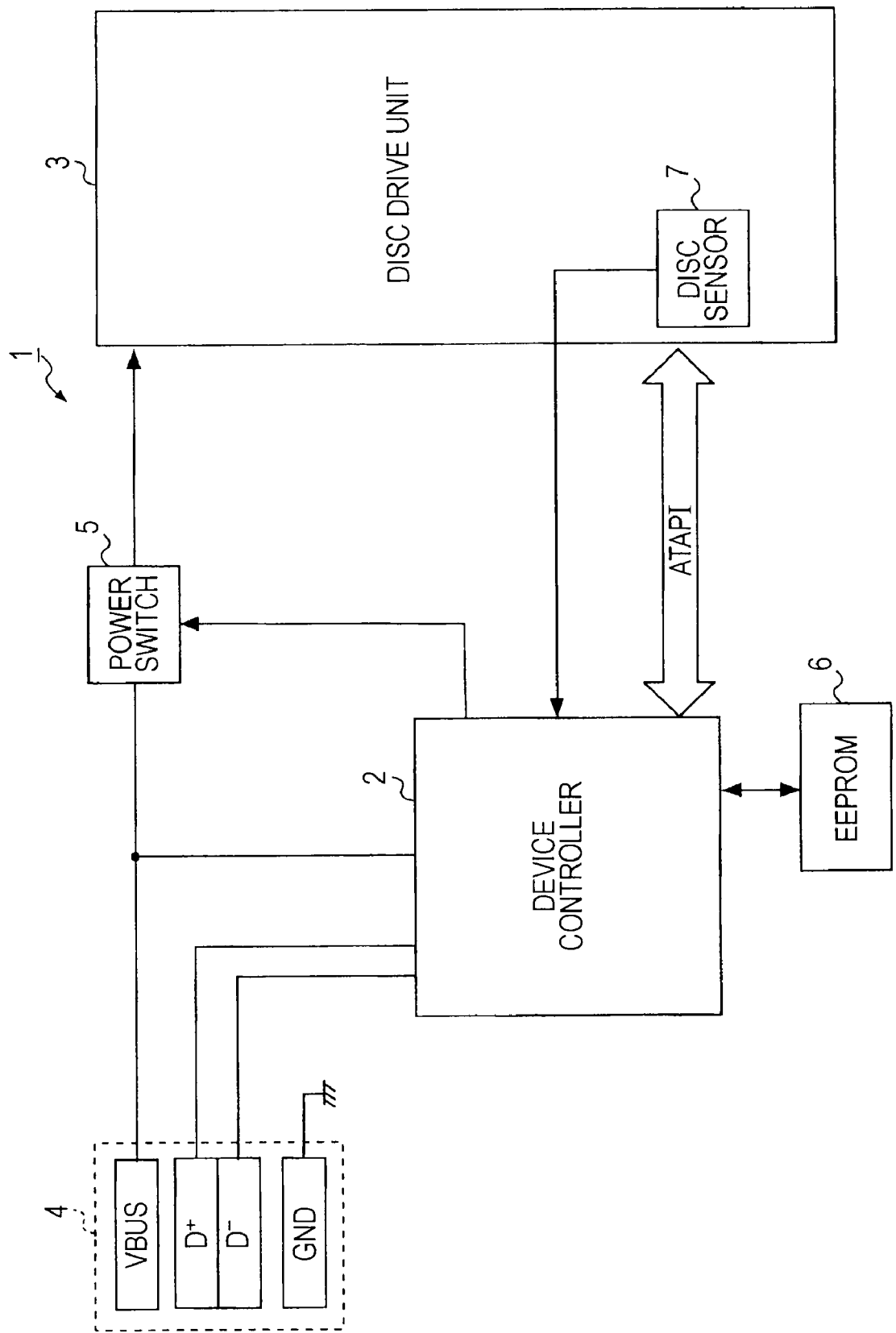
FIG. 3 is a block diagram of a USB device in the embodiment.

FIG. 3 illustrates a configuration example of the USB device 1. The USB device 1 of the present example is specifically an optical disc drive. The USB device 1 includes a device controller 2, a disc drive unit 3, a USB terminal unit 4, a power switch 5, an EEP-ROM (Electrically Erasable and Programmable Read-Only Memory) 6, and a disc sensor 7.

The disc drive unit 3 performs a recording or reproducing operation on a portable recording medium, such as a CD, a DVD, and a Blu-ray disc, for example. The disc drive unit 3 is configured to include, for example, an optical head mechanism, a spindle mechanism, a circuit system for performing recording or reproducing signal processing, encoding or decoding, and so forth, a servo mechanism, a control unit for controlling the recording or reproducing operation, and so forth. The disc drive unit 3 functions as a main operation unit which uses, in the operation thereof, the non-standard current (e.g., 1 A) higher than the upper limit current value (500 mA) specified by the USB standard.

The device controller 2 performs USB communication with the host device 100 and the control of the disc drive unit 3. As a characteristic operation of the device controller 2, the device controller 2 operates in the standard power mode (e.g., the 500 mA mode or the 100 mA mode), which consumes current not exceeding the upper limit current value specified by the USB standard, to send the host device 100 the information indicating the use of the non-standard current (e.g., 1 A). Further, upon receipt from the host device 100 of the permission to use the extended power mode, which consumes the non-standard current, the device controller 2 performs a process of switching the power mode from the standard power mode to the extended power mode and activating the operation of the disc drive unit 3. The term activating refers to providing a state in which the disc drive unit 3 can perform the recording or reproducing operation, e.g., turning on the power supply of the disc drive unit 3. The disc controller 2 and the disc drive unit 3 are connected to each other by ATAPI (AT Attachment Packet Interface), for example, to exchange commands and recording and reproducing data.

The EEP-ROM 6 is used to store an operation program of the device controller 2 and a variety of data, for example.

As the USB terminal unit 4, a terminal structure for performing the connection to the USB cable 50 is formed. In the USB standard, four lines VBUS, D+, D−, and GND are specified. D+ and D− represent data lines, and VBUS and GND represent a power supply voltage line and a ground line, respectively. Through the data lines D+ and D−, the data communication is performed. The device controller 2 sends and receives signals to and from the host device 100 through the data lines D+ and D−. Through the power supply voltage line and the ground line (VBUS and GND), the so-called USB bus power is supplied.

The device controller 2 uses the USB bus power as the operating power. The device controller 2 does not particularly consume the non-standard current, and thus can operate in the 100 mA mode, for example. That is, in a state in which the USB device 1 is USB-connected to the host device 100 or the like, for example, the device controller 2 can operate by using the USB bus power.

Meanwhile, the disc drive unit 3 consumes the non-standard current in the operation thereof. The disc drive unit 3 is supplied with the USB bus power via the power switch 5. The power switch 5 is a switching circuit for switching between supply and cutoff of the USB bus power to the disc drive unit 3. The device controller 2 performs on-off control of the power supply to the disc drive unit 3 by the power switch 5.

As described above, the USB device 1 of the present example can internally perform the on-off control of the power supply of the disc drive unit 3. That is, during the operation of the USB device 1, the device controller 2 can activate (power on) or inactivate (power off) the disc drive unit 3.

The disc sensor 7 is a sensor which detects the loading or non-loading of an optical disc in the disc drive unit 3. A detection signal from the disc sensor 7 is supplied to the device controller 2. Thereby, the device controller 2 can detect the insertion or ejection of an optical disc into or from the disc drive unit 3.

In the power-on state of the disc drive unit 3, the device controller 2 can detect the presence or absence of an optical disc on the basis of the command defined by ATAPI. In the power-off state of the disc drive unit 3, however, the device controller 2 is prevented from performing the detection. In the present example, the disc sensor 7 enables the detection of the loading or non-loading of an optical disc even in the power-off state of the disc drive unit 3. The disc sensor 7 is used for the purpose of detecting the insertion of an optical disc in the power-off state of the disc drive unit 3, for example.

4. Operation Performed when USB Device is Connected to Host Device

Description will be made of an operation performed when the host device 100 and the USB device 1 as described above are connected to each other.

Figure 4:
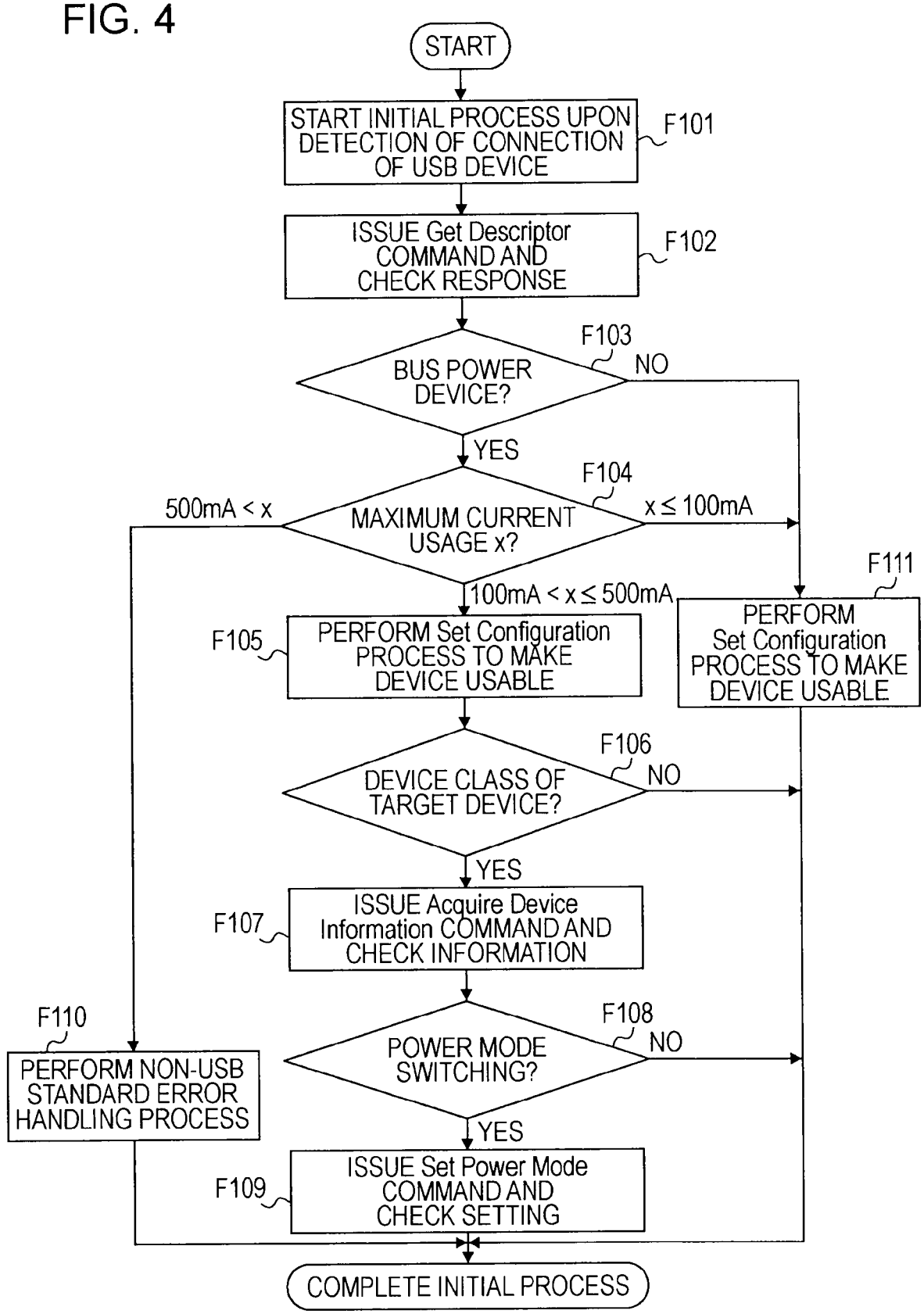
FIG. 4 is a flowchart of a process performed by the host device in the embodiment.
Figure 5:
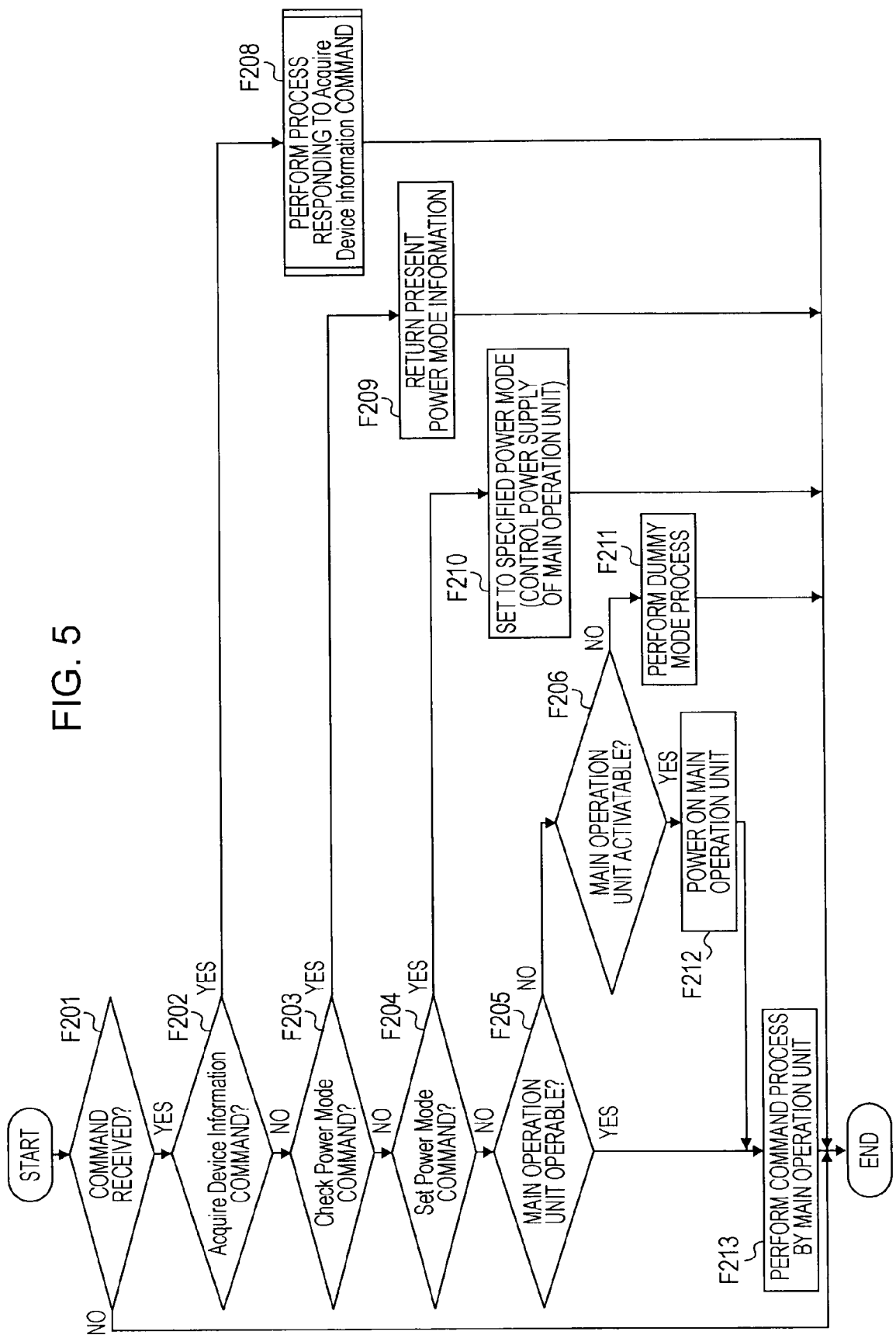
FIG. 5 is a flowchart of a command response process performed by the USB device in the embodiment.
Figure 6:
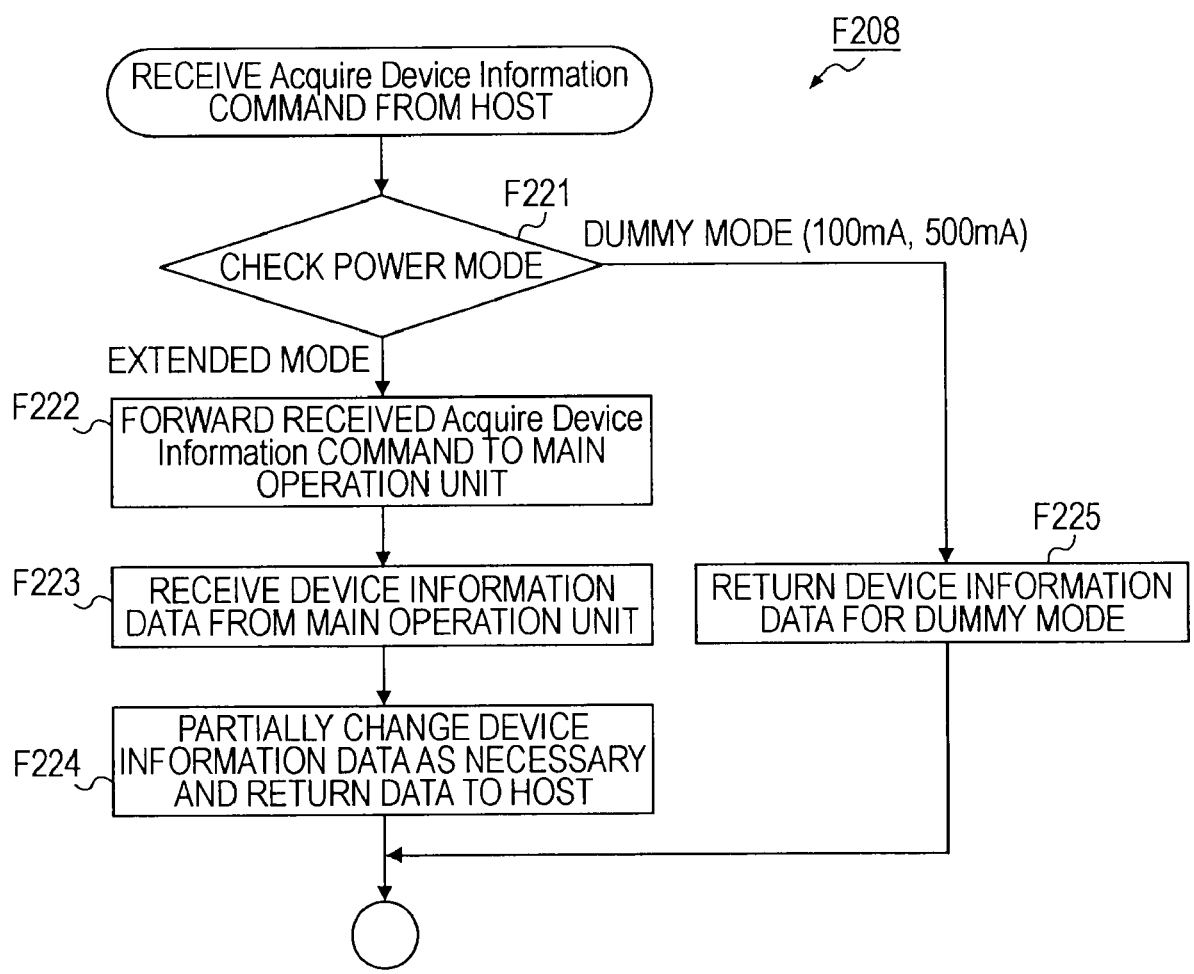
FIG. 6 is a flowchart of a command response process responding to an Acquire Device Information command performed by the USB device in the embodiment.

FIG. 4 illustrates a process performed by the host device 100, which is a process performed by the CPU 101 on the basis of the software including the application programs, the OS, and the device drivers. Further, FIGS. 5 and 6 illustrate a process performed by the USB device 1, which is a process performed by the device controller 2 in response to the issuance of a command from the host device 100. FIG. 7 illustrates the flow of processes performed when the host device 100 and the USB device 1 are connected to each other.

Firstly, the process of FIG. 4 performed by the host device 100 and the process of FIGS. 5 and 6 performed by the USB device 1 will be schematically described. Thereafter, with reference to FIG. 7, an operation performed at the time of connection, which is realized by the respective processes of FIGS. 4, 5, and 6, will be described in detail.

The host device 100 performs the process of FIG. 4, if the host device 100 is connected to a device according to the USB format, which is not limited to the USB device 1 of the present example. Firstly, at Step F101, upon detection that the host device 100 has been connected to an external device via the USB interface unit 112, the CPU 101 starts an initial process for establishing the USB connection. At Step F102, the CPU 101 issues a Get Descriptor command, and checks a response from the device connected to the host device 100.

Normally, configuration is performed as a process initially performed between USB-connected devices. The configuration refers to a process of confirming that a connected device is a normal USB device and permitting the USB connection. Using the Get Descriptor command (although plural types of descriptors exist, description thereof is omitted here), the USB-connected host device first inquires of the peripheral device connected thereto about the type of the peripheral device. In response to the inquiry, the peripheral device returns a variety of information relating to the USB function thereof (descriptor). The host device checks the response to confirm the type of the peripheral device connected thereto, and performs a Set Configuration process. That is, the host device performs device setting (address setting) relating to the peripheral device to permit the USB communication. Step F102 of FIG. 4 represents a process of basic configuration performed in the USB connection as described above.

After having checked the response to the Get Descriptor command, the CPU 101 proceeds to one of different processes at Step F103, depending on whether or not the connected peripheral device is a bus power device. If the connected peripheral device is not a bus power device, i.e., if the connected peripheral device is a device in which the power supply as the USB bus power is unnecessary, the CPU 101 proceeds to Step F111, and performs the Set Configuration process to bring the USB-connected peripheral device into a usable state. Thereby, the initial process is completed. Thereafter, the CPU 101 performs, on the present connected device, the process for a normal USB-connected device.

If the CPU 101 recognizes from the response to the Get Descriptor command that the connected device is a bus power device, the CPU 101 proceeds from Step F103 to Step F104, and checks the maximum current usage of the device. The response to the Get Descriptor command sent from the connected device includes the information of the maximum current usage of the device. If the maximum current usage of the device is 100 mA or less, the CPU 101 proceeds to Step F111, and performs the Set Configuration process to bring the connected peripheral device into a usable state. Thereby, the CPU 101 completes the initial process. Thereafter, the CPU 101 performs, on the present connected device, the processing for a normal USB-connected device.

If it is found from the response from the connected device that the maximum current usage value exceeds 500 mA, the CPU 101 proceeds to Step F110 to performs an error handling process, since the value exceeds the limit of the USB standard. In this case, the CPU 101 determines the present connection as erroneous connection, and completes the process without performing the Set Configuration process.

As described later, the USB device 1 of the present example is configured to return, in the response to the Get Descriptor command, data including the information notifying that the maximum current usage is 500 mA. In the configuration process, therefore, the USB device 1 of the present example is not determined to be subjected to the error handing process at Step F110 as a device using the non-standard current.

If it is found from the response from the connected device that the maximum current usage is 500 mA or less (and more than 100 mA), the CPU 101 proceeds to Step F105, and performs the Set Configuration process to bring the USB-connected peripheral device into a usable state. In this case, the peripheral device notifying that the maximum current usage thereof is 500 mA or less includes the USB device 1 of the present example. Therefore, the host device 100 of the present example performs the processes of Step F106 and the subsequent steps.

Firstly, on the basis of the content of the data obtained at Step F102, the CPU 101 checks the device class of the connected peripheral device, and checks whether or not the checked device class is the device class corresponding to the USB device 1 of the present example. If the USB device 1 of the present example is a USB Mass Storage Class device, the CPU 101 checks whether or not the present connected device is the USB Mass Storage Class device. If the present connected device is not the target device (e.g., the USB Mass Storage Class device), the CPU 101 completes the initial process at Step F106, and thereafter performs, on the present connected device, the process for a normal USB-connected device.

If the device class of the present connected device is the device class of the USB Mass Storage Class device, for example, and if there is a possibility that the present connected device is the USB device 1 of the present example, the CPU 101 issues an Acquire Device Information command (e.g., an Inquiry command) at Step F107. That is, the CPU 101 requests the information notifying the type of the present connected device, which is a USB Mass Storage Class device. The connected device returns a response to the Acquire Device Information command. Thereby, the CPU 101 can specifically check the type of the connected device (e.g., a DVD drive, a CD-ROM drive, a flexible disc drive, or a flash memory device).

Herein, if the connected device is the USB device 1 of the present example, the USB device 1 notifies, in the return data responding to the Acquire Device Information command, that the USB device 1 is a device using 1 A of current, particularly as specific information determined between the USB device 1 and the host device 100 of the present example. The information is not recognized by another host device not according to the embodiment of the present invention. That is, the host device 100 of the present example can recognize that the connected device is the USB device 1 of the present example, which uses the non-standard current.

If the CPU 101 recognizes the connected device not to be the USB device 1 of the present example, i.e., if the CPU 101 recognizes the connected device to be another USB-connected device using a maximum of 500 mA of current, the switching of the power mode is not particularly necessary. Therefore, the CPU 101 completes the initial process at Step F108, and thereafter performs, on the present connected device, the process for a normal USB-connected device.

Meanwhile, if the CPU 101 recognizes the connected device to be the USB device 1 of the present example, the CPU 101 determines at Step F108 that the switching of the power mode in the USB device 1 is necessary, and proceeds to Step F109. Herein, the switching of the power mode is necessary, since the USB device 1 has been operating in the standard power mode (e.g., the 500 mA mode) up to this point of time to perform the initial operation. To make the USB device 1 normally function as the optical disc drive, it is necessary to instruct the USB device 1 to use the extended power mode.

At Step F109, therefore, the CPU 101 issues a Set Power Mode command to instruct the USB device 1 to switch the power mode to the extended power mode. Then, the CPU 101 confirms that the power mode has been switched to the extended power mode in the USB device 1, and completes the initial process. In this case, the USB device 1 can obtain the operating power from the USB bus power, and the disc drive unit 3 consuming a maximum of 1 A of current can function.

Subsequently, with reference to FIGS. 5 and 6, description will be made of the command response process performed by the device controller 2 of the USB device 1 of the present example as an embodiment of the present invention. In the following description, the term "another host device" will continue to be used to refer to a host device not according to the embodiment of the present invention. Meanwhile, to collectively refer to both the host device 100 of the present example as the embodiment and another host device, the devices will be described as "the host device 100 or the like."

As the process performed by the device controller 2, the process of FIG. 5 is performed, when the USB device 1 is connected to the host device 100 or the like and a command is issued by the host device 100 or the like. The device controller 2 determines, as Step F201, the receipt or non-receipt of a command, and proceeds to Step F202 upon receipt of a command from the host device 100 or the like.

At Step F202, the device controller 2 determines whether or not the received command is the Acquire Device Information command (e.g., the Inquiry command). If the received command is the Acquire Device Information command, the device controller 2 proceeds to Step F208, and performs a process responding to the Acquire Device Information command. The process will be described later in FIG. 6.

If the received command is not the Acquire Device Information command, the device controller 2 checks at Step F203 whether or not the received command is a Check Power Mode command. If the received command is the Check Power Mode command, the device controller 2 proceeds to Step F209, and returns the present power mode information to the host device 100.

In the USB device 1 of the present example, the 100 mA mode and the 500 mA mode are prepared as the standard power mode, and the extended power mode is prepared as the mode using 1 A of current of exceeding the limit of the standard. Therefore, the present power mode information returned in response to the Check Power Mode command is the information representing one of the 100 mA mode, the 500 mA mode, and the extended power mode.

If the received command is not the Check Power Mode command, the device controller 2 checks at Step F204 whether or not the received command is the Set Power Mode command. If the received command is the Set Power Mode command, the device controller 2 proceeds to Step F210 to switch to the power mode specified by the command and control the power supply of the main operation unit. As described above, in the USB device 1 of the present example, the main operation unit is the disc drive unit 3.

For example, if the host device 100 specifies the extended power mode through the Set Power Mode command, the device controller 2 switches to the extended power mode, and turns on the power switch 5. Thereby, the disc drive unit 3 is powered on and activated.

Meanwhile, if the host device 100 specifies the 500 mA mode through the Set Power Mode command, the device controller 2 switches to the 500 mA mode. Further, if the power mode has been set to the extended power mode and the disc drive unit 3 has been activated, the device controller 2 turns off the power switch 5 to bring the disc drive unit 3 into the power-off state.

If the received command is not the Set Power Mode command, the device controller 2 determines that the command is a command relating to the recording or reproducing operation of the disc drive unit 3 functioning as the main operation unit (a Read command or a Write command).

In fact, the command may be another command not relating to the recording or reproducing operation of the disc drive unit 3, such as a Suspend command and a Resume command described later. However, such commands are omitted in FIG. 5 for simplified explanation. That is, in the present description, the command is assumed to be one of the Acquire Device Information command, the Check Power Mode command, the Set Power Mode command, and the Record or Reproduce command. In fact, however, if the Suspend command, the Resume command, or the like is received, the device controller 2 is assumed to perform a process responding to the command. Further, if a command other than the Record or Reproduce command to the disc drive unit 3 is received, the device controller 2 is assumed to perform a process similar to the process responding to the Record or Reproduce command.

If the received command is the Write command requesting the recording operation to be performed in the disc drive unit 3 or the Read command requesting the reproducing operation to be performed in the disc drive unit 3, the device controller 2 first checks at Step F205 whether or not the disc drive unit 3 functioning as the main operation unit is presently operable, i.e., whether or not the disc drive unit 3 is supplied with the USB bus power via the power switch 5 and is in the power-on state in which the disc drive unit 3 is operable.

If the disc drive unit 3 is in the power-on state, the device controller 2 proceeds from Step F205 to Step F213, and passes the command to the main operation unit (the disc drive unit 3) to cause the disc drive unit 3 to perform the process responding to the command. That is, the device controller 2 causes the disc drive unit 3 to perform the recording or reproducing operation.

Meanwhile, if the disc drive unit 3 is in the power-off state at the time of receipt of the Read command or the Write command, the device controller 2 proceeds from Step F205 to Step F206, and determines whether or not the disc drive unit 3 can be activated. This is a process of checking the present power mode. That is, if the power mode is the extended power mode, the device controller 2 determines that the disc derive unit 3 can be activated.

If the present power mode is the extended power mode, and if the disc drive unit 3 is in the power-off state for some reason, the device controller 2 controls the power switch 5 at Step F212 to bring the disc drive unit 3 into the power-on state. Then, at Step F213, the device controller 2 causes the disc drive unit 3 to perform the process responding to the Read command or the Write command.

According to the foregoing description, the power-on control of the disc drive unit 3 is performed at Step F210 upon instruction by the Set Power Mode command to set the extended power mode. At Step F210, however, the power-on control may not be performed. This is because, in such a case, the power-on control of the disc drive unit 3 is performed at Step F212 upon first receipt of the Read command or the Write command.

Further, as described later, if the USB device 1 is connected to another host device, the USB device 1 is not switched to the extended power mode. Therefore, the device controller 2 does not perform the power-on control of the disc drive unit 3.

However, another host device recognizes the USB device 1 of the present example as a normal USB disc drive device, and thus may issue the Read command or the Write command. In such a case, the process by the device controller 2 proceeds from Step F205 to Step F206, and determines that the disc drive unit 3 is prevented from being activated due to the standard power mode (the 100 mA mode or the 500 mA mode). In this case, the device controller 2 proceeds to Step F211 to perform a dummy mode process.

Herein, the dummy mode process refers to a process of making the another host device believe that a disc is not loaded in the disc drive unit 3, i.e., a process of returning a "No Medium Error (No Medium Loaded)" message in response to the Read command or the Write command. In the present example, the dummy mode can be considered to be a state in which the power mode is set to the standard power mode (the 100 mA mode or the 500 mA mode).

Subsequently, with reference to FIG. 6, description will be made of the process responding to the Acquire Device Information command performed at Step F208 described above. If the device controller 2 receives the Acquire Device Information command and proceeds to Step F208 in FIG. 5 described above, the device controller 2 performs the process of FIG. 6. Firstly, as Step F221, the device controller 2 checks the present power mode. If the present power mode is the 100 mA mode or the 500 mA mode, the device controller 2 returns, as Step F225, device information data for the dummy mode to the host device 100 or the like connected to the USB device 1.

As described later in FIG. 7, in the initial state of the connection of the USB device 1 to the host device 100 or the like, the USB device 1 operates in the 100 mA mode, for example. Therefore, if the host device 100 sends the USB device 1 the Acquire Device Information command at Step F107 of FIG. 4, for example, the USB device 1 returns the device information data for the dummy mode to the host device 100.

Meanwhile, if the USB device 1 is connected to another host device, the another device does not issue the Set Power Mode command, which instructs to switch to the extended power mode. Thus, the power mode remains to be the 100 mA mode or the 500 mA mode. Therefore, if the Acquire Device Information command is issued by the another host device, the USB device 1 usually returns the device information data for the dummy mode.

Further, if the power mode at the time of receipt of the Acquire Device Information command is the extended power mode, the device controller 2 proceeds from Step F221 to Step F222, and forwards the received Acquire Device Information command to the main operation unit (the disc drive unit 3). Then, at Step F223, the device controller 2 receives the device information data from the disc drive unit 3. At Step F224, the device controller 2 partially changes the device information data as necessary, and returns the partially changed device information data to the host device 100.

FIG. 8A illustrates an example of the device information data for the dummy mode sent at Step F225. Further, FIG. 8B illustrates an example of the device information data sent at Step F224. The device information data for the dummy mode of FIG. 8A represents a response returned in the power-off state of the disc drive unit 3, and is the information with which the device controller 2 responds in place of the disc drive unit 3. The device information data of FIG. 8B is the information of the response data of the disc drive unit 3 partially changed and returned to the host device 100 by the device controller 2 in response to the Acquire Device Information command from the host device 100 received and directly sent to the disc drive unit 3 by the device controller 2. In the information, a part (a vendor-specific part) of the response data has been changed.

As illustrated in FIG. 8A, the device information data includes the information of the peripheral device type, the RMB (Removable Media Bit), the ISO (International Organization for Standardization) version, the ECMA (European Computer Manufacturer Association) version, the ANSI (American National Standards Institute) version, the ATAPI transport version, the response data format, the additional length, the SCCS (Source Code Control System), and so forth, and the information of the vendor identification, the product identification, the product revision level, and so forth. In the device information data for the dummy mode, predetermined values are set as the above-described information items. Further, the normal device information data illustrated in FIG. 8B is returned with the data contents thereof set as the values of the main operation unit (the disc drive unit 3).

In the device information data of FIGS. 8A and 8B, an area corresponding to byte positions 35 to 55 is a vendor specific area which can be freely used by a manufacturer. The USB device 1 (the device controller 2) of the present example provides the area with the information notifying that the USB device 1 is a device using a maximum of 1 A of current, and returns the resultant information to the host device 100 or the like.

According to the foregoing description, the USB device 1 of the present example notifies, in response to the Acquire Device Information command issued at Step F107 of FIG. 4, that the USB device 1 is a device using 1 A of current, as the specific information determined between the USB device 1 and the host device 100 of the present example. The notification can be accomplished with the use of the vendor-specific area of the device information data as described above. Another host device does not recognize "the information notifying that the USB device 1 is a device using a maximum of 1 A of current," which is recorded in the area, as valid data.

The process by the host device 100 and the command response process by the USB device 1 have been described above. With these processes performed, the operation as illustrated in FIG. 7 is performed when the host device 100 and the USB device 1 are connected to each other.

FIG. 7 illustrates the processes starting at the time of connection of the host device 100 and the USB device 1 by the USB cable 50. The processes by the host device 100 (the CPU 101) are represented by reference numerals (h1) to (h10), and the processes by the USB device 1 (the device controller 2) are represented by reference numerals (d1) to (d7). In the description of the respective processes, parts corresponding to the parts of FIGS. 4, 5, and 6 described above will be added with the corresponding step numbers.

In the process (d1), upon connection of the two devices by the USB cable 50, the device controller 2 of the USB device 1 is activated with the supply of the USB bus power. At the time of activation, the device controller 2 sets the power mode to the 100 mA mode.

In the process (h1), upon activation of the device controller 2 of the USB device 1, the CPU 101 of the host device 100 detects that some kind of USB device has been connected to the host device 100, and starts the initial process (F101).

In the process (h2), the host device 100 issues the Get Descriptor command (F102).

In the process (d2), in accordance with the Get Descriptor command, the USB device 1 notifies the host device 100 of the data. In this process, through the return data, the USB device 1 notifies the host device 100 that the maximum current usage thereof is 500 mA.

In the process (h3), the host device 100 receives the data responding to the Get Descriptor command, and checks the content of the data (F102). From the content of the data received in this process, the host device 100 can recognize that the device connected thereto (the USB device 1) is a proper USB-connected device, and that the connected device is a USB Mass Storage Class device using 500 mA of current.

In the process (h4), if the host device 100 can confirm that the device of the other party is a proper USB-connected device, and that the maximum current usage of the device is within the limit of the standard and thus there is no problem, the host device 100 performs the Set Configuration process (F102→F103→F104→F105). That is, the host device 100 performs the device setting, recognizes the USB device 1 as a USB-connected external device, and permits the communication with the USB device 1.

In the process (d3), from the perspective of the USB device 1, the USB device 1 is recognized by the host device 100 as a proper USB-connected device and permitted to use a maximum of 500 mA of current. In this case, the device controller 2 sets the power mode to the 500 mA mode.

In the process (h5), the host device 100 recognizes that the device presently connected thereto is a USB Mass Storage Class device (corresponding to a device of the extended power mode, in this case), and thus issues the Acquire Device Information command (F105→F106→F107).

In the process (d4), the device controller 2 of the USB device 1 returns the device information in accordance with the Acquire Device Information command (F201→F202→F208). In this case, the power mode is set to be the 500 mA mode. Therefore, the device controller 2 returns the device information data for the dummy mode illustrated in FIG. 8A (F211→F225). In this process, the information notifying that the USB device 1 is a device using a maximum of 1 A of current is described in the vendor-specific area of the device information data.

In the process (h6), the host device 100 checks the returned device information data to recognize the device, and determines on the basis of the information of the vendor-specific area whether or not the device is a device using the non-standard current.

If the connected device is another kind of USB Mass Storage Class device other than the USB device 1 of the present example, the information indicating that the connected device is a device using the non-standard current is not described in the vendor-specific area. In such a case, the initial process is completed (F108→COMPLETE INITIAL PROCESS).

Meanwhile, the vendor-specific area of the device information data returned by the USB device 1 in the process (d4) described above includes a description of the information indicating that the device is a device using the non-standard current. Upon recognition of the description, the host device 100 checks the state of the power supply thereof to check whether or not to be able to supply the non-standard current (1 A) requested by the device.

In the process (h7), if the host device 100 recognizes that the device connected thereto is a device using the non-standard current and confirms that the host device 100 can supply the non-standard current requested by the device, the host device 100 issues the Set Power Mode command.

FIG. 9A illustrates an example of the Set Power Mode command. As illustrated in the drawing, an operation code (OP code) indicates the Set Power Mode command, and the command specifies the data type and the power mode. The data type specifies the type of the value specified by the power mode. For example, the data type specifies whether the value is for setting the present power mode (the value is activated immediately after the setting) or for setting the initial power mode immediately after the USB connection (the value is activated in the next USB connection). Further, the power mode specifies one of the 100 mA mode, the 500 mA mode, and the extended power mode, for example.

In the above-described process (h7), with the Set Power Mode command, the host device 100 instructs to set the extended power mode as the present power mode.

In the process (d5), in accordance with the Set Power Mode command, the USB device 1 sets the power mode. That is, due to the Set Power Mode command, the device controller 2 is permitted by the host device 100 to set the extended power mode, which consumes the non-standard current (1 A of current). Therefore, the device controller 2 sets the extended power mode in accordance with the Set Power Mode command. In this process, the device controller 2 sets the power mode to the extended power mode, and performs the power-on control of the disc drive unit 3 (F204→F210). At this point of time, the USB device 1 is set in the extended power mode, in which the disc drive unit 3 can operate.

In the process (h8), the host device 100 checks the power mode setting of the USB device 1 (F109). In this process, the host device 100 sends the Check Power Mode command.

FIG. 9B illustrates an example of the Check Power Mode command. As illustrated in the drawing, an operation code (OP code) indicates the Check Power Mode command, and the command specifies the data type. The data type describes whether what is requested to be checked is the present power mode or the initial power mode immediately after the USB connection. In this case, the present power mode is requested to be checked.

In the process (d6), the device controller 2 of the USB device 1 returns the information of the power mode in accordance with the Check Power Mode command. In the return data, the power mode requested to be checked is described in the data type of the format illustrated in FIG. 9B. In this case, the information indicating that the present power mode is the "extended power mode" is described and returned.

In the process (h9), with the return of the power mode information, the host device 100 confirms that the USB device 1 has been set in the extended power mode, and completes the initial process.

In the process (h10), after the completion of the initial process, the host device 100 issues the Read command or the Write command to request the USB device 1 to perform the reproducing or recording operation.

In the process (d7), in the USB device 1, the disc drive unit 3 operates in accordance with the Read command or the Write command to perform the data reproduction or recording (F213).

5. Operation Performed when USB Device is Connected to Another Host Device

The operation described above is the operation performed when the USB device 1 of the present example is connected to the host device 100 of the present example. Meanwhile, if the USB device 1 of the present example is connected to "another host device" not according to the embodiment of the present invention, an operation as illustrated in FIG. 10 is performed. The processes by the another host device are represented by reference numerals (nh1) to (nh5), and the processes by the USB device 1 (the device controller 2) are represented by reference numerals (d1) to (d3) and (d10).

In the process (d1), upon connection of the two devices by the USB cable 50, the device controller 2 of the USB device 1 is activated with the supply of the USB bus power. At the time of activation, the device controller 2 sets the power mode to the 100 mA mode.

In the process (nh1), upon activation of the device controller 2 of the USB device 1, the another host device detects that some kind of USB device has been connected thereto, and starts the initial process.

In the process (nh2), the another host device issues the Get Descriptor command.

In the process (d2), in accordance with the Get Descriptor command, the USB device 1 notifies the another host device of the data. In this process, through the return data, the USB device 1 notifies the another host device that the maximum current usage thereof is 500 mA.

In the process (nh3), the another host device receives the data responding to the Get Descriptor command, and checks the content of the data. From the content of the data received in this process, the another host device can recognize that the device connected thereto (the USB device 1) is a proper USB-connected device, and that the connected device is a USB Mass Storage Class device using 500 mA of current.

In the process (nh4), if the another host device can confirm that the device of the other party is a proper USB-connected device, and that the maximum current usage of the device is within the limit of the standard and thus there is no problem, the another host device performs the Set Configuration process. That is, the another host device performs the device setting, recognizes the USB device 1 as a USB-connected external device, and permits the communication with the USB device 1. At this point of time, the initial process is completed.

In the process (d3), from the perspective of the USB device 1, the USB device 1 is recognized by the another host device as a proper USB-connected device and permitted to use a maximum of 500 mA of current. In this case, the device controller 2 sets the power mode to the 500 mA mode.

In the process (nh5), after the completion of the initial process, the another host device issues the Read command or the Write command to request the USB device 1 to perform the reproducing or recording operation.

In the process (d10), in accordance with the Read command or the Write command, the USB device 1, which is operating in the 500 mA mode with the disc drive unit 3 set in the power-off state, performs the dummy mode process as Step F211 of FIG. 5.

As described above, in the dummy mode, the USB device 1 basically returns the "No Medium Error" message. With the return of the information indicating the absence of a medium, the another host device only performs the normal error handling process, and thus no trouble arises. Further, the OS of a host device normally does not issue the Read command or the Write command to a device which have been determined not to contain a medium. With the return of the "No Medium Error" message, therefore, an unexpected error can be prevented from occurring in most of the subsequent processes. That is, if the USB device 1 of the present example is connected to the another host device, the USB device 1 is practically prevented from being used as an optical disc drive, but does not cause a trouble by drawing the non-standard current from the another host device.

6. Suspend Process and Resume Process

Subsequently, a suspend operation and a resume operation will be described. From the viewpoint of power saving, it is preferable to place the USB device 1 in the suspended state when the device is not used. Further, it is appropriate to enable the USB device 1 to resume from the suspended state when necessary. The operations of the present example performed in such a case will now be described.

Figure 11:
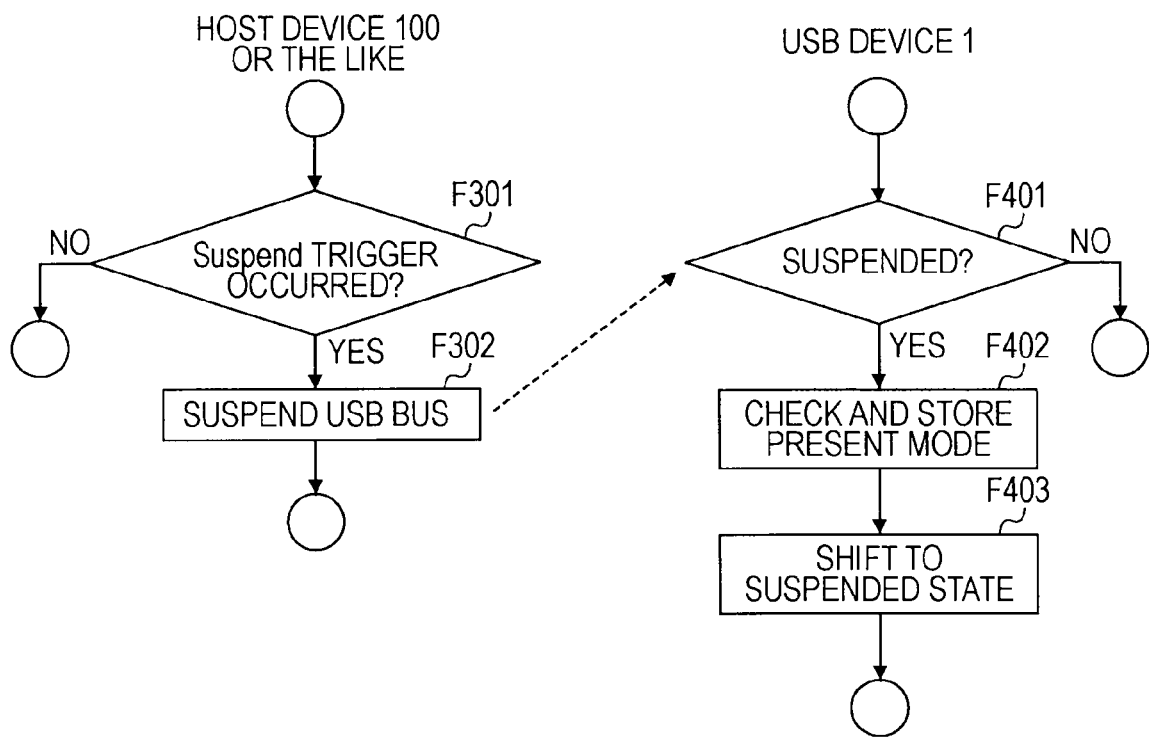
FIG. 11 is a flowchart of a suspend process performed in the embodiment.

FIG. 11 illustrates the suspend process performed by the host device 100 or the like (the host device 100 of the present example or another host device) and the USB device 1 of the present example. Generally, the suspend process of a USB-connected device refers to a process of suspending all of devices connected by a USB bus. For example, the suspend process includes a process performed by a personal computer, which functions as the host device 100 or the like, to suspend all of USB devices connected thereto. A process of suspending only a specific USB device is referred to as a selective suspend process. The selective suspend process of the USB device 1 of the present example will be described later.

Step F301 as a process by the host device 100 or the like represents the monitoring of the occurrence of a Suspend trigger. For example, when a shift to a power saving mode or a sleep mode occurs due to timer setting or user operation, or when a cover of a notebook-type personal computer is closed, the CPU of the host device 100 or the like recognizes the occurrence of the Suspend trigger. Then, in accordance with the occurrence of the Suspend trigger, the CPU performs the process of suspending the USB bus at Step F302.

If the process of suspending the USB bus is performed, the device controller 2 of the USB device 1 proceeds from Step F401 to Step F402, and checks and stores the present power mode state in the EEP-ROM 6 (or an internal memory of the device controller 2, for example). Then, after the storage process, the device controller 2 shifts to the suspended state at Step F403. In this process, the device controller 2 powers off the disc drive unit 3 by using the power switch 5. That is, the device controller 2 is configured to store the information indicating which one of the extended power mode, the 500 mA mode, and the 100 mA mode, for example, is the power mode at the time of the shift to the suspended state.

Figure 12:
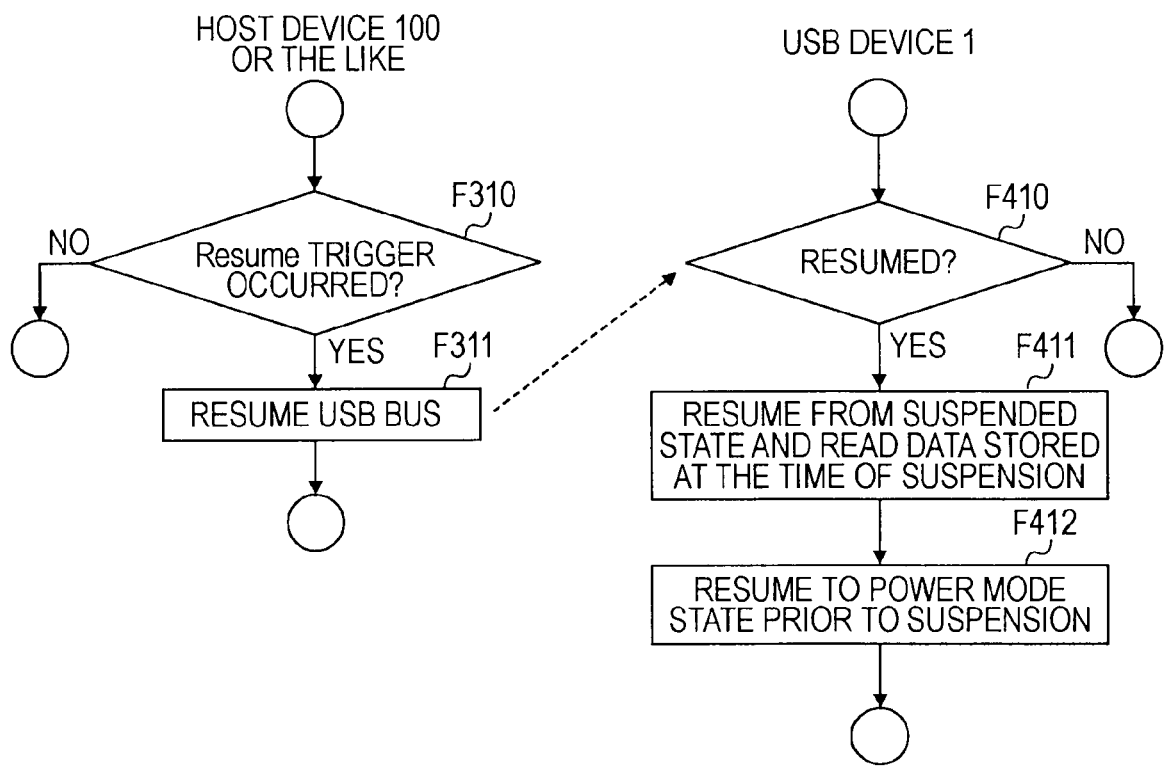
FIG. 12 is a flowchart of a resume process performed in the embodiment.

Subsequently, FIG. 12 illustrates the resume operation from the suspended state described above. The CPU of the host device 100 or the like monitors the occurrence of a Resume trigger at Step F310, and resumes the USB bus at Step F311 in accordance with the Resume trigger. Upon resumption of the USB bus, the device controller 2 of the USB device 1 proceeds from Step F410 to Step F411 to resume from the suspended state and read the power mode information stored in the EEP-ROM 6 (or the internal memory of the device controller 2, for example) at the time of suspension. Then, at Step F412, the device controller 2 resumes to the power mode state prior to the suspension. In this process, the device controller 2 powers on the disc drive unit 3 as necessary by using the power switch 5.

Subsequently, description will be made of selective suspend processes which can be performed by the host device 100 of the present example and the USB device 1 of the present example. For example, from the viewpoint of power saving, it is preferable to place the USB device 1 in the suspended state when an optical disc is not loaded in the disc drive unit 3. Therefore, it is conceivable to perform the selective suspend process upon ejection of an optical disc during the operation of the disc drive unit 3 in the extended power mode.

Figure 13:
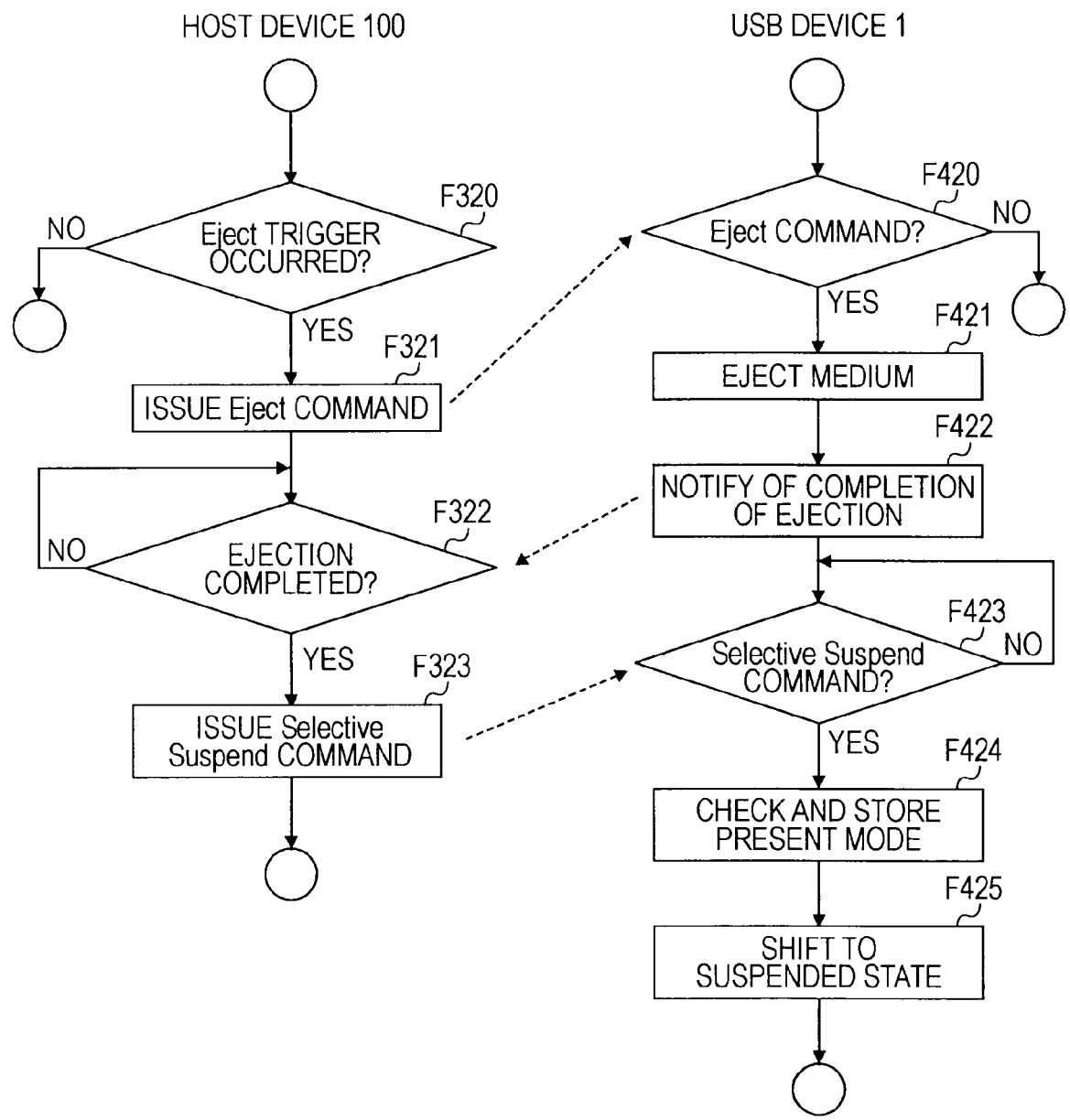
FIG. 13 is a flowchart of a selective suspend process performed in ejection of a disc in the embodiment.

FIG. 13 illustrates the selective suspend process performed in the ejection of a disc. Upon occurrence of an Eject trigger based on user operation or a request from an application program or the OS, for example, the CPU 101 of the host device 100 proceeds from Step F320 to Step F321, and issues an Eject command to the USB device 1.

Upon receipt of the Eject command, the device controller 2 of the USB device 1 proceeds from Step F420 to Step F421 to pass the Eject command to the disc drive unit 3 and cause the disc drive unit 3 to perform an operation of ejecting the medium. Then, the device controller 2 confirms the completion of the ejection of the medium, and sends the host device 100 an ejection completion notification at Step F422.

After the issuance of the Eject command, the CPU 101 of the host device 100 waits for the completion of the ejection at Step F322. Then, upon receipt of the ejection completion notification, the CPU 101 proceeds to Step F323, and issues a Selective Suspend command to the USB device 1.

Upon receipt of the Selective Suspend command, the device controller 2 of the USB device 1 proceeds from Step F423 to Step F424, and checks and stores the present power mode state in the EEP-ROM 6 (or the internal memory of the device controller 2, for example). Then, after the storage process, the device controller 2 shifts to the suspended state at Step F425.

That is, when the optical disc is ejected, the USB device 1 shifts to the suspended state. Further, at the time of suspension, the USB device 1 stores the information indicating which one of the extended power mode, the 500 mA mode, and the 100 mA mode, for example, is the power mode at the time of suspension. In this case, the entire USB bus of the host device 100 is not suspended, but the USB device 1 is solely brought into the suspended state.

Figure 14:
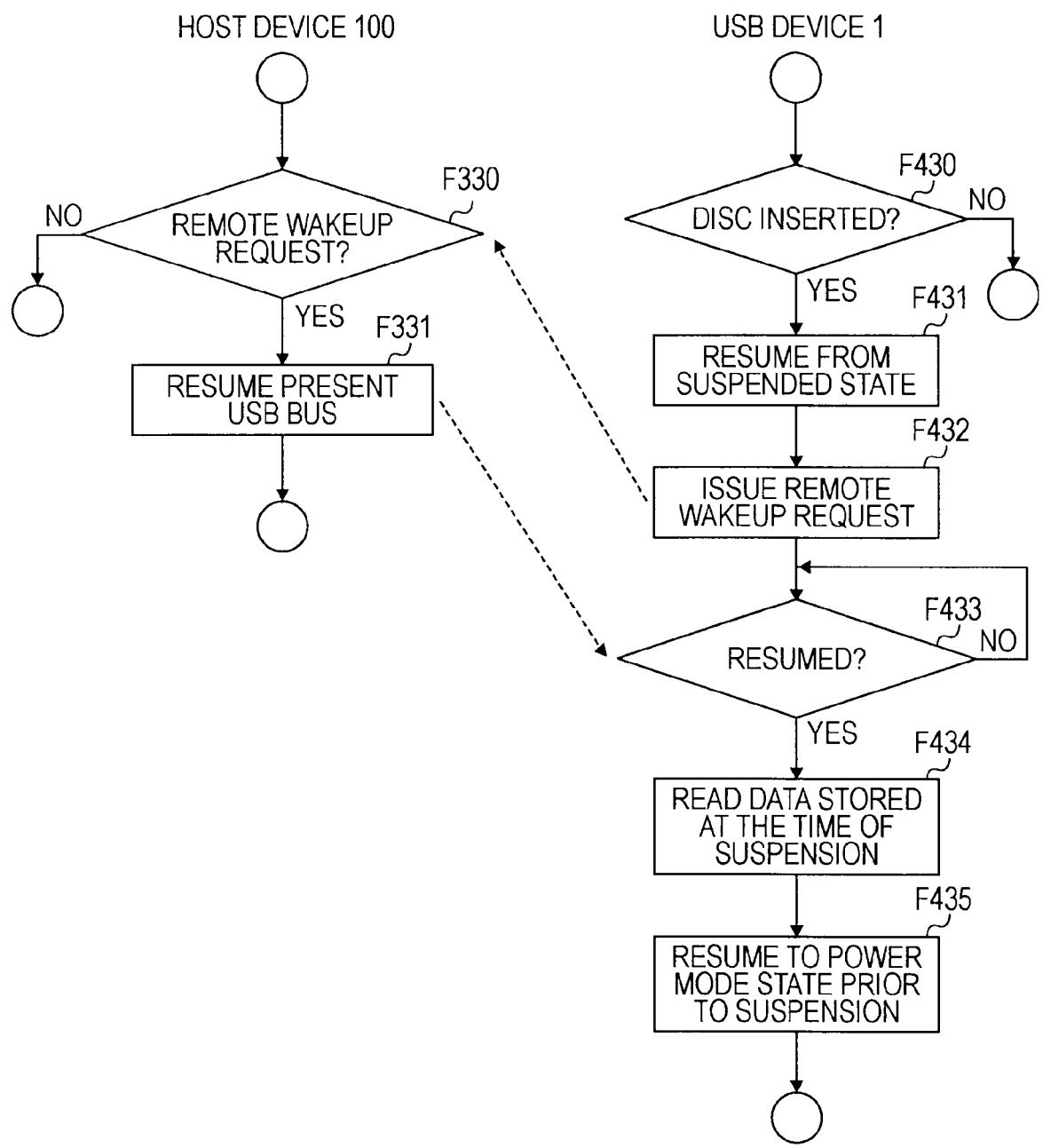
FIG. 14 is a flowchart of a resume process performed in insertion of a disc in the embodiment.

FIG. 14 illustrates an example of the resume process from the suspended state in accordance with the insertion of a disc. During the suspension period, the device controller 2 of the USB device 1 monitors the insertion of a disc at Step F430. That is, the device controller 2 checks detection information from the disc sensor 7. Upon detection of the insertion of a disc, the device controller 2 proceeds from Step F430 to Step F431, and resumes from the suspended state. Then, at Step F432, the device controller 2 issues a remote wakeup request to the host device 100.

Upon receipt of the remote wakeup request, the CPU 101 of the host device 100 proceeds from Step F330 to Step F331, and resumes the USB bus. That is, the CPU 101 recognizes that the USB device 1 has resumed from the suspended state, and determines the USB device 1 to be a valid device.

Upon resumption by the host device 100, the device controller 2 of the USB device 1 proceeds from Step F433 to Step F434, and reads the information of the power mode stored in the EEP-ROM 6 (or the internal memory of the device controller 2, for example) at the time of suspension. Then, at Step F435, the device controller 2 resumes to the power mode state prior to the suspension.

Figure 15:
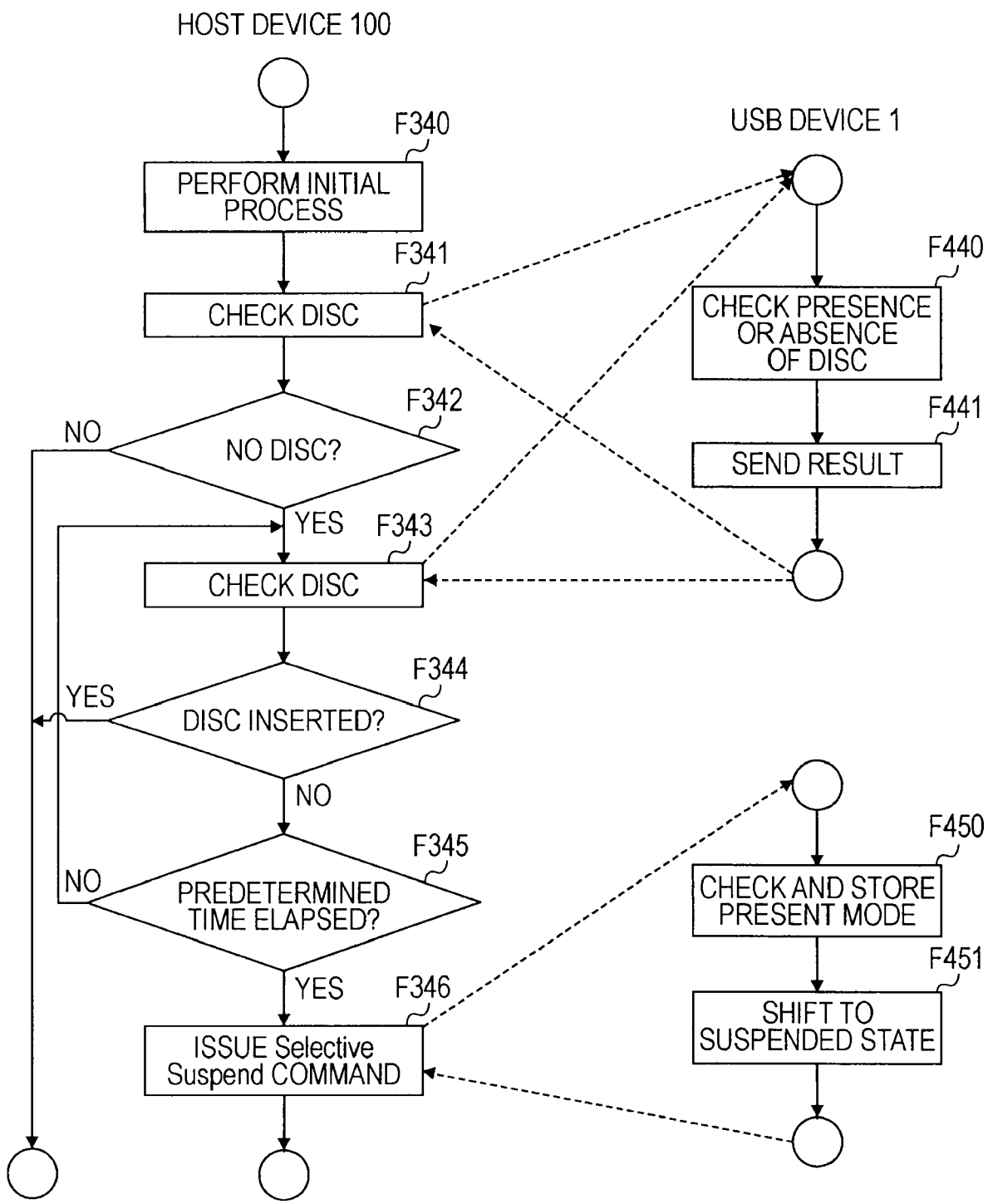
FIG. 15 is a flowchart of a selective suspend process performed after the initial process in the embodiment.

Subsequently, the selective suspend process performed after the completion of the initial process will be described. As the initial process is performed in the above-described manner between the host device 100 and the USB device 1 of the present example, the USB device 1 can normally operate in the extended power mode. If an optical disc is not inserted in the USB device 1 in this state, however, the USB device 1 may be brought into the suspended state. FIG. 15 illustrates the selective suspend process performed in such a case.

As Step F340, the CPU 101 of the host device 100 completes the above-described initial process (the processes represented as the processes (h1) to (h9) in FIG. 7). Then, at Step F341, the CPU 101 checks whether or not an optical disc is loaded in the USB device 1. That is, the CPU 101 issues a Check Disc Presence/Absence command to the USB device 1.

Upon receipt of the Check Disc Presence/Absence command, the device controller 2 of the USB device 1 checks, as Step F440, the loading or non-loading of an optical disc on the basis of the detection information received from the disc sensor 7 at the time of reception of the command or on the basis of the communication with the disc drive unit 3. Then, at Step F441, the device controller 2 sends the host device 100 the result, i.e., the information indicating whether or not an optical disc is loaded in the disc drive unit 3.

In the host device 100, the CPU 101 checks the loading or non-loading of an optical disc on the basis of the response from the USB device 1. If an optical disc is loaded in the USB device 1, the CPU 101 departs from the process illustrated in FIG. 15, and thereafter performs, as necessary, the access to the USB device 1 as illustrated in FIG. 7 as the process (h10).

The host device 100 periodically checks the presence or absence of a disc in the USB device 1. If the host device 100 confirms the non-loading of an optical disc at Step F342, the host device 100 proceeds to Step F343 to again check the loading or non-loading of an optical disc in the USB device 1, i.e., to issue the Check Disc Presence/Absence command.

In the USB device 1, at every issuance of the Check Disc Presence/Absence command, the device controller 2 performs the processes of Steps F440 and F441 to return the host device 100 the check result of the loading or non-loading of an optical disc.

At Step F345, the CPU 101 checks whether or not a predetermined time has elapsed since the completion of the initial process. Then, if the loading of a disc is confirmed before the elapse of the predetermined time, the CPU 101 at Step F344 departs from the process illustrated in FIG. 15. That is, if an optical disc is inserted by a user within the predetermined time after the completion of the initial process following the connection of the USB device 1, the selective suspend process is not performed.

In consideration of normal usage by users, the loading of an optical disc into the USB device 1 is considered to follow the connection of the USB device 1 to the host device 100 in many cases. Therefore, it can be considered that an optical disc is not loaded immediately after the completion of the initial process in many cases. In view of this, it is not a very appropriate process to perform the selective suspend process immediately after the completion of the initial process because an optical disc is not loaded.

With this taken into account, in the present example, the host device 100 stands by for the predetermined time at Step F345. The predetermined time is a standby time based on the assumption that an optical disc is inserted by a user after the connection of the USB device 1. The standby time may be approximately thirty seconds to one minute or approximately five minutes, for example.

If the predetermined time elapses without the notification of the loading of an optical disc, the host device 100 proceeds to Step F346, and issues the Selective Suspend command. That is, if the predetermined time elapses without the insertion of an optical disc by a user, the host device 100 issues the Selective Suspend command at Step F346.

If the Selective Suspend command is issued, the device controller 2 of the USB device 1 performs the process of Step F450. That is, the device controller 2 checks and stores the present power mode state in the EEP-ROM 6 (or the internal memory of the device controller 2, for example). Then, after the storage process, the device controller 2 shifts to the suspended state at Step F451.

As described above, if an optical disc is not loaded in the USB device 1 for the predetermined time after the USB-connection of the USB device 1 to the host device 100, the USB device 1 is controlled to be placed in the suspended state. If an optical disc is inserted by a user after the shift to the suspended state, the USB device 1 resumes from the suspended state due to the resume operation of FIG. 14 described above.

7. Effects of Embodiment and Modification Examples

The embodiment has been described above. The USB device 1 and the host device 100 of the embodiment have the following characteristics.

The USB device 1 uses the current exceeding the limit of the USB standard to operate the disc drive unit 3 functioning as the main operation unit.

The USB device 1 can set the standard power modes (the 100 mA mode and the 500 mA mode) and the extended power mode, which consumes a maximum of 1 A of current, for example. Further, the USB device 1 can set the power mode in accordance with the special command determined between the USB device 1 and the host device 100.

In the USB device 1, in accordance with the power mode set by the host device 100, the device controller 2 controls the power supply of the disc drive unit 3 functioning as the main operation unit.

On the basis of the response to the Acquire Device Information command (e.g., the Inquiry command) determined between the host device 100 and the USB device 1, the host device 100 can check whether or not the device connected thereto is a device using the non-standard current and having the power mode setting function.

On the basis of the response to the Check Power Mode command determined between the host device 100 and the USB device 1, the host device 100 can check the power mode setting state of the USB device 1.

The USB device 1 has the dummy mode, in which the device controller 2 responds to a command from the host device 100 in place of the disc drive unit 3 when the USB device 1 is in the 100 mA mode or the 500 mA mode and thus the disc drive unit 3 is in the inoperable state (e.g., the power-off state).

In the USB device 1 and the host device 100 as described above, the USB device 1, which is a device using the current exceeding the limit of the USB standard, e.g., 1 A of current, can obtain the operating power as the USB bus power from the host device 100. In the USB device 1, therefore, the acquisition of the operating power by the connection of an AC adaptor or the like is unnecessary. As a result, the usability for users can be substantially improved.

Further, if the USB device 1 is connected to "another host device" not according to the embodiment of the present invention, the USB device 1 does not draw the non-standard current from the USB bus power. Thus, the USB device 1 does not cause a trouble in the another host device. That is, if the USB device 1 is connected to another host device, the USB device 1 only consumes the current according to the standard, and thus the safety can be ensured.

Further, the USB device 1 establishes normal USB connection with another host device. Further, if the Read command or the Write command is issued by the another host device, the USB device 1 returns the "No Medium Error" message to the another host device as the dummy mode. Thereby, an unexpected trouble can be prevented from occurring in the another host device and a peripheral device thereof.

If the USB device 1 is connected to the another host device, the USB device 1 does not function as an optical disc drive. However, the another host device is after all a device not supporting the operation of an optical disc drive. Therefore, it suffices if an unexpected situation can be prevented, and the limitation in function of the USB device 1 as a peripheral device is permissible.

Further, due to the suspend operation and the resume operation, appropriate operations in consideration of power saving are achieved. Firstly, with the suspend process as illustrated in FIG. 11, the USB device 1 can shift to the suspended state in accordance with the operation of the host device. Further, at the time of suspension, the USB device 1 stores the power mode state so as to be able to resume to the original power mode state in the resume process.

Further, due to the selective suspend process performed in accordance with the ejection or non-loading of an optical disc, power saving can be appropriately achieved. Also in such a case, the USB device 1 stores the power mode state so as to be able to resume to the original power mode state in the resume process.

Meanwhile, in the suspended state, the host device 100 is prevented from communicating with the USB device 1. If there is no device for resuming the communication between the USB device 1 and the host device 100 when the USB device 1 has been placed in the suspended state due to the ejection of a disc, for example, the USB device 1 may remain in the unusable state. As a result, even if a medium is inserted into the USB device 1, for example, the USB device 1 may not shift to the usable state. In such a case, if the USB connection of the devices is once cancelled and thereafter the devices are re-connected, the USB device 1 can be brought into the usable state. This method, however, is inconvenient for users.

As illustrated in FIG. 14, therefore, in the above-described embodiment, the USB device 1 issues the remote wakeup request upon insertion of an optical disc to resume the USB bus from the suspended state and thus resume the communication between the USB device 1 and the host device 100. With this configuration, the above-described inconvenience is solved.

In the above description, the insertion of a disc is taken as an example. However, it is of course also possible to resume the USB bus from the suspended state by issuing the remote wakeup request on the basis of an action other than the insertion of a disc (e.g., a button operation by a user).

In the embodiment, the examples of FIGS. 9A and 9B are taken as the Set Power Mode command and the Check Power Mode command, respectively. In the examples, in addition to the setting of the present power mode, the setting of the power mode immediately after the USB connection can be performed.

If the instruction to set the initial power mode immediately after the USB connection is received through the Set Power Mode command, the device controller 2 of the USB device 1 stores the setting of the initial power mode in the non-volatile memory such as the EEP-ROM 6. Then, in the USB connection, the USB device 1 is activated in the thus stored power mode state.

As described above, the method capable of setting the power mode immediately after the USB connection to a desired mode including the extended power mode is prepared. Therefore, the embodiment can serve the purpose of performing an operation test or an emergency procedure, for example.

For example, in a host device which has been known to be able to supply the power requested by the USB device 1, and which is difficult to be installed with a power mode control program or the like, the embodiment is effective when the USB device 1 is desired to be used in the extended power mode immediately after the USB connection of the USB device 1 for the purpose of a test or an emergency procedure, for example.

Further, there may be a case in which a host device can supply the power requested by the USB device 1 but lacks a function of turning on the extended power mode of the USB device 1 by using a BIOS (Basic Input/Output System). In such a case, when the system is desired to be activated by an optical disc for such reasons as OS replacement, the optical disc can be used if the USB device 1 is set to be used in the extended power mode immediately after the USB connection of the USB device 1.

The present invention is not limited, in terms of the configuration and operation thereof, to the example described as the embodiment. Thus, a variety of modification examples and application examples are conceivable. Such examples will be described below.

In FIG. 7, description has been made of the initial process performed when the USB device 1 and the host device 100 are connected to each other. In this case, the USB device 1 is initially set in the 100 mA mode, and thereafter is set in the 500 mA mode by the configuration process. Further, in accordance with the Set Power Mode command from the host device 100, the USB device 1 is set in the extended power mode. In this example, there is no substantial difference between the 100 mA mode and the 500 mA mode from the viewpoint of hardware and power consumption. The 100 mA mode is a transitional state prior to a shift to the 500 mA mode.

Therefore, an example not using the 500 mA mode, for example, is conceivable as a modification example. That is, the power mode may be switched from the 100 mA mode to the extended power mode with no use of the 500 mA mode. The device controller 2 may set the power mode to the 100 mA mode at the time of activation, and thereafter may maintain the 100 mA mode until the receipt of the instruction through the Set Power Mode command by the host device 100 to set the extended power mode. In such a case, in the process (d2) of FIG. 7, the device controller 2 sets 100 mA as the maximum current usage to be notified to the host device 100. Then, the device controller 2 maintains the 100 mA mode in the process (d3) and thereafter in accordance with the Set Configuration process performed on the assumption that the USB device 1 is a device using 100 mA of current. As the process performed by the host device 100, the determination of Step F104 in FIG. 4 can be modified. That is, the host device 100 can be configured to proceed to Step F105 if the relationship x≦100 mA is established, and to proceed to Step F111 if the relationship 100 mA<x≦500 mA is established.

Further, it is also conceivable to use a plurality of extended power modes to form a further developing system. For example, three extended modes as described below may be defined, and the host device may be configured to be able to use the modes as necessary. That is, the power modes may include: the 100 mA mode, in which a maximum of 100 mA of current is consumed and only functions operable by current of 100 mA or less can be used; the 500 mA mode, in which a maximum of 500 mA of current is consumed and only functions operable by current of 500 mA or less can be used; a first extended power mode, in which a maximum of 700 mA of current is consumed and only minimum necessary functions and performance can be used; a second extended power mode, in which a maximum of 1 A of current is consumed, and which is superior to the first extended power mode in functions and performance; and a third extended power mode, in which a maximum of 1.2 A of current is consumed and all functions and performance can be used.

The power mode may be made settable as described above to enable the selection of an appropriate mode in accordance with the power supply capability of the host device 100 or the requested device function. This configuration has such advantages as increasing the processing speed and enabling the use of a new function when a large amount of power can be consumed, for example.

Further, the 500 mA mode may be subdivided as follows. That is, the power modes may include: the 100 mA mode, in which a maximum of 100 mA of current is consumed and only functions operable by current of 100 mA or less can be used; a first 500 mA mode, in which a maximum of 300 mA of current is consumed and only functions operable by current of 300 mA or less can be used; a second 500 mA mode, in which a maximum of 500 mA of current is consumed and only functions operable by current of 500 mA or less can be used; a first extended power mode, in which a maximum of 700 mA of current is consumed and only minimum necessary functions and performance can be used; a second extended power mode, in which a maximum of 1 A of current is consumed, and which is superior to the first extended power mode in functions and performance; and a third extended power mode, in which a maximum of 1.2 A of current is consumed and all functions and performance can be used. For example, the first 500 mA mode can be considered to be a power mode selected when emphasis is placed on power saving.

With the power modes thus subdivided, refined control can be performed in accordance with such factors as the state, the request, and the specification of the host device. For example, if the host device is operated by an external power supply, the USB device 1 may be operated in the maximum power mode. Meanwhile, if the host device is operated by a battery, the power mode can be switched when the power consumption is desired to be suppressed in spite of some limitation of the functions and performance, or when the remaining capacity of the battery falls below a particular reference value, for example. Further, the power mode can also be switched depending on the power consumption, the performance, the multifunctionality, or the like emphasized in the operational state.

Also in the case in which the power modes are subdivided as described above, the host device 100 can set the power mode of the USB device 1 by using the Set Power Mode command as illustrated in FIG. 9A. That is, the parameter can be determined such that one of the 100 mA mode, the first 500 mA mode, the second 500 mA mode, the first extended power mode, the second extended power mode, and the third extended power mode, for example, can be specified as the power mode of FIG. 9A.

In the embodiment, description has been made with the example in which the USB device 1 is an optical disc drive. Of course, however, a variety of devices are conceivable as the USB device 1. For example, in addition to the optical disc drive, such devices as a magnetic disc drive, a USB memory device, an HDD, a display device, an input device including a keyboard and so forth, a digital still camera, a video camera, a printer device, a transmission device, a reception device, a communication device, a mobile phone, an information processing device (a PDA (Personal Digital Assistant) including a personal computer), and a home electronic appliance can be employed as the peripheral device according the embodiment of the present invention corresponding to the USB device 1.

Further, the embodiment has been described with the example in which the host device 100 is a personal computer. Similarly to the above, a variety of devices such as a mobile phone, a PDA, an AV (Audio-Visual) device, a game device, and a home electronic appliance, for example, are conceivable as the host device 100.

Further, description has been made of the example using the interface standard called USB. However, the present invention can also be applied to another interface standard, such as IEEE (Institute of Electrical and Electronics Engineers) 1394, for example. Particularly, the present invention can be preferably applied to an interface standard for supplying power through a connection cable.

In the embodiment, the response to the Inquiry command has been described as an example of the device information indicating the use of the non-standard current. However, another method can also be used, as long as the method is permitted by the employed interface standard. For example, in the USB standard, data called Standard Device Descriptor is returned to a USB host device by a USB device in accordance with a request from the USB host device. If the Vendor ID (Identifier) and the Product ID included in the data are set to respective values unique to the device, and if the host device stores the Vendor ID and the Product ID of the device using the non-standard current, the host device can make the determination. The method is, of course, not limited to the examples described above. Thus, a method convenient for the system can be selected as the device information indicating the use of the non-standard current.

Further, in the USB device 1 of the embodiment, an external power supply such as an AC adaptor is basically unnecessary. However, the USB device 1 can also be configured to be connectable to an external power supply, as necessary, to enable the use of the USB device 1 connected to another host device. For example, when the USB device 1 is connected to the external power supply, the USB device 1 can be operated solely by the external power supply without the use of the power supply from the interface, and the main operation unit can be typically kept in the power-on state.

It should be understood by those skilled in the art that various modifications, combinations, sub-combinations and alterations may occur depending on design requirements and other factors insofar as they are within the scope of the appended claims or the equivalents thereof.

What is claimed is:

1. A peripheral device connected to a host device by a transmission path according to a predetermined interface standard that allows to communicate with the host device, and configured to operate with power supply received from the host device through the transmission path with either a standard current or a non-standard current, the peripheral device comprising:
- a main operation unit configured to use, in the operation thereof, the non-standard current that is higher than an upper limit current value of the standard current specified by the interface standard; and
- a control unit configured to operate in a standard power mode, which consumes the standard current not exceeding the upper limit current value specified by the interface standard, to send the host device information indicating the use of the non-standard current via the transmission path, and configured to perform, upon receipt from the host device of permission to use an extended power mode, which consumes the non-standard current, a process of activating the operation of the main operation unit in the extended power mode.

2. The peripheral device according to claim 1, wherein, if the control unit receives from the host device a command relating to the operation of the main operation unit after the activation of the operation of the main operation unit in the extended power mode, the control unit causes the main operation unit to perform an operation according to the command.

3. The peripheral device according to claim 2, wherein, if the control unit does not receive the permission to use the extended power mode, which permits the use of the non-standard current, from the host device connected by the transmission path according to the predetermined interface standard, the control unit maintains the standard power mode and does not activate the operation of the main operation unit.

4. The peripheral device according to claim 3, wherein, in the standard power mode, if the control unit receives the command relating to the operation of the main operation unit from the host device connected by the transmission path according to the predetermined interface standard, the control unit sends predetermined dummy information in response to the command.

5. The peripheral device according to claim 1, wherein the control unit performs, as the activating process, a process of starting the power supply to the main operation unit from the transmission path.

6. The peripheral device according to claim 1, wherein, in accordance with a device information request from the host device connected by the transmission path according to the predetermined interface standard, the control unit sends the information indicating the use of the non-standard current as information recognizable solely by a host device capable of handling the non-standard current.

7. The peripheral device according to claim 1, wherein the predetermined interface standard is an Universal Serial Bus.

8. The peripheral device according to claim 1, wherein, upon receipt from the host device of an instruction to suspend the operation, the control unit stores in a memory unit the information of the power mode at the time of receipt of the instruction, and then performs a process of shifting to a suspended state.

9. The peripheral device according to claim 8, wherein, upon receipt from the host device of an instruction to resume the operation, the control unit reads the information of the power mode stored in the memory unit, and performs a process of resuming to the state of the read power mode.

10. A method of operating a peripheral device, wherein the peripheral device is connected to a host device by a transmission path according to a predetermined interface standard that allows to communicate with the host device, and is configured to operate with power supply received from the host device through the transmission path with either a standard current or a non-standard current,
wherein the peripheral device includes
- a main operation unit configured to use, in the operation thereof, the non-standard current higher than an upper limit current value of the standard current specified by the interface standard, and
- a control unit configured to control the communication with the host device and the operation of the main operation unit, and wherein the method comprises the steps of:
- causing the control unit to operate in a standard power mode, which consumes a current not exceeding the upper limit current value of the standard current specified by the interface standard, to send the host device information indicating the use of the non-standard current via the transmission path; and
- causing the control unit to activate, upon receipt from the host device of permission to use an extended power mode, which permits the use of the non-standard current, the operation of the main operation unit by setting the power mode to the extended power mode.

11. A host device connected to a peripheral device by a transmission path according to a predetermined interface standard that allows to communicate with the peripheral device, and configured to supply power to the peripheral device through the transmission path with either a standard current or a non-standard current,
wherein, in the power supply to the peripheral device, the host device is configured to supply the non-standard current higher than an upper limit current value of the standard current specified by the interface standard, and
wherein the host device comprises a control unit configured to send the peripheral device permission to use an extended power mode, which consumes the non-standard current via the transmission path, upon receipt from the peripheral device of information indicating the use of the non-standard current.

12. A method of operating a host device,
wherein the host device is connected to a peripheral device by a transmission path according to a predetermined interface standard that allows to communicate with the peripheral device, and is configured to supply power to the peripheral device through the transmission path with either a standard current or a non-standard current,
wherein, in the power supply to the peripheral device, the host device is configured to supply the non-standard current higher than an upper limit current value of the standard current specified by the interface standard, and
wherein the method comprises the steps of:
- receiving from the peripheral device information indicating the use of the non-standard current via the transmission path; and
- sending the peripheral device permission to use an extended power mode, which consumes the non-standard current, upon receipt of the information.

13. An electronic device system in which a peripheral device and a host device are connected to each other by a transmission path according to a predetermined interface standard that allows to communicate with each other, and in which the peripheral device is configured to operate with power supply received from the host device through the transmission path with either a standard current or a non-standard current,
  wherein the peripheral device includes
    a main operation unit configured to use, in the operation thereof, the non-standard current higher than an upper limit current value of the standard current specified by the interface standard, and
    a control unit configured to operate in a standard power mode, which consumes current not exceeding the upper limit current value of the standard current specified by the interface standard, to send the host device information indicating the use of the non-standard current via the transmission path, and configured to perform, upon receipt from the host device of permission to use an extended power mode, which consumes the non-standard current, a process of activating the operation of the main operation unit in the extended power mode,
  wherein the host device is configured to be able to supply the transmission path with the non-standard current higher than the upper limit current value specified by the interface standard, and
  wherein the host device includes a control unit configured to send the peripheral device the permission to use the extended power mode, which consumes the non-standard current via the transmission path, upon receipt from the peripheral device of the information indicating the use of the non-standard current via the transmission path.

* * * * *